US012217199B1

(12) United States Patent
Mallampati et al.

(10) Patent No.: US 12,217,199 B1
(45) Date of Patent: Feb. 4, 2025

(54) SYSTEM AND METHOD FOR INTERMODAL DUAL-STREAM-BASED RESOURCE OPTIMIZATION

(71) Applicant: BNSF Railway Company, Fort Worth, TX (US)

(72) Inventors: Dasaradh R. Mallampati, Trophy Club, TX (US); Vishal Badyal, Fort Worth, TX (US); Paul Kuhn, Fort Worth, TX (US); April Y. Kuo, Colleyville, TX (US)

(73) Assignee: BNSF Railway Company, Fort Worth, TX (US)

( * ) Notice: Subject to any disclaimer, the term of this patent is extended or adjusted under 35 U.S.C. 154(b) by 0 days.

(21) Appl. No.: 18/501,608

(22) Filed: Nov. 3, 2023

(51) Int. Cl.
    *G06Q 10/06* (2023.01)
    *G06Q 10/04* (2023.01)
    *G06Q 10/0631* (2023.01)
    *G06Q 10/08* (2023.01)

(52) U.S. Cl.
    CPC ....... *G06Q 10/06313* (2013.01); *G06Q 10/04* (2013.01); *G06Q 10/08* (2013.01)

(58) Field of Classification Search
    CPC ..................................................... G06Q 10/06
    See application file for complete search history.

(56) References Cited

U.S. PATENT DOCUMENTS

| 9,123,239 B2 * | 9/2015 | Kurzhanskiy ........ G08G 1/0145 |
| 10,943,318 B2 * | 3/2021 | Benedict ................. B61L 27/16 |
| 2002/0082814 A1 | 6/2002 | Doner |
| 2014/0236957 A1 * | 8/2014 | Rieppi .................... G06Q 10/04 |
| | | 707/741 |
| 2016/0342933 A1 | 11/2016 | Johnson et al. |
| 2019/0287066 A1 | 9/2019 | Kellaway, Jr. et al. |
| 2023/0007439 A1 * | 1/2023 | Williams ........... G06Q 10/0635 |

FOREIGN PATENT DOCUMENTS

CA    3153593 A1 *  3/2021    .......... B61L 27/0016

OTHER PUBLICATIONS

Tomas Lidén, Coordinating maintenance windows and train trafc: a case study, Case Study and Applications, Accepted: Feb. 12, 2020 / Published online: Apr. 26, 2020. (Year: 2020).*

\* cited by examiner

*Primary Examiner* — Kurtis Gills
(74) *Attorney, Agent, or Firm* — Whitaker Chalk Swindle & Schwartz PLLC; Enrique Sanchez, Jr.; Juan Vasquez

(57) ABSTRACT

Systems and techniques for optimizing hub resources and maximizing hub throughput based on dual-stream resource optimization (DSRO). In embodiments, a first flow of units arriving to the hub from customers to be loaded into departing trains is represented as a consolidation stream, and a second flow of units arriving to the hub via arriving trains to be unloaded and delivered customers is represented as a deconsolidation stream. A time-space network is generated for each of the consolidation and deconsolidation streams, and included in a DSRO model. Each stage of the streams is represented as a node of the corresponding time-space network in the DSRO model, which also models resource interdependence between the streams. An operating schedule based on the DSRO model optimizes the resources over a planning horizon to ensure they are allocated to both streams fairly so as to maximize the unit flow during operations.

16 Claims, 7 Drawing Sheets

SYSTEM AND METHOD FOR INTERMODAL DUAL-STREAM-BASED RESOURCE OPTIMIZATION

TECHNICAL FIELD

The present disclosure relates generally to resource optimization systems, and more particularly to systems and devices for managing hub resources based on dual-stream resource optimization.

BACKGROUND

Transportation operations are the backbone of progress, as they allow goods and people to be moved where they are needed. Transportations operations include movement by ships, planes, trucks, railroads, etc. Typically, goods are shipped in containers/trailers, which may then be loaded onto a vehicle for transportation to a destination. However, the complexity of transportation systems cannot be overstated, as it involves a complex synchronization of a vast number of resources to move goods from a source to a destination.

An intermodal hub facility (IHF) may include a hub facility in which goods received from customers are placed into trains and transported to their respective destinations, and/or trains carrying goods are received and unloaded for eventual pickup by customers. In particular, an IHF is characterized in that units (e.g., containers/trailers including goods) may be configured to be transported by different modes of transportation (e.g., rail, trucks, ships, planes, etc.). Typically, in operations of an IHF, a unit (e.g., a container/trailer carrying goods) may be transported (e.g., on a trailer of a truck) from a customer location to the IHF, where the unit may be processed and loaded (e.g., using the various resources of the IHF) onto a train that may be destined for a destination IHF. Upon arrival at the destination IHF, the unit may be unloaded from the train and processed for delivery to the destination customer. On the other side of operations of the IHF, units (e.g., containers/trailers carrying goods) may arrive at the IHF (e.g., via trains carrying the units). Upon arrival, the units may be unloaded from the train and processed (e.g., using the various resources of the IHF) for delivery to customers. In this manner, the IHF resources may be used for processing thousands and even millions of units that arrive from customers and/or via a train to the IHF.

In some cases, the same IHF resources may be used to process units that arrive from customers to be loaded onto trains and to process units that arrive via trains to be unloaded for delivery to customers. For example, parking spaces within the IHF may be used to park units arriving from customers and units unloaded from trains. In this case, the parking spaces are considered to be a shared resource, as a parking space could be used by a unit that arrive via a train or a unit that arrive from a customer. Even more, units that arrive from customers may compete with units that arrive via train for these shared parking spaces, as the parking spaces are limited resources. In another example, hostlers may be used to load a unit onto a train (e.g., to load a unit that arrives from a customer onto a train), but may also be used to unload a unit that arrives via a train from the train. These hostlers may also be shared resources, the use of the hostlers may be collaborative, as a hostler used to load a unit that arrive from a customer onto a train may then be used to unload a unit from a train that is close to the hostler. In this case, the use of the hostler may be collaborative.

In a similar manner, a wide variety of IHF resources may be used to process units that arrive from customers and units that arrive via train into the IHF before the units exit the IHF, and the use of these IHF resources may be collaborative or competing. As such, in some operations, the use of some IHF resources to process units that arrive from customers and units that arrive via train may complement each other, and in some cases the use of some IHF resources to process units that arrive from customers may compete for the same IHF resources to units that arrive via train.

However, considering that competition and/or collaboration of IHF resources during IHF operations, the productivity and resource levels of the IHF during operations may be driven by the unit volume (e.g., the number of units arriving at the IHF), the dwell time of each unit (e.g., the time the unit spends within the IHF), the replenishment cycles of the various IHF resources, the interdependence between various IHF resources, and/or a host of other factors. Synchronizing or optimizing the use of the various IHF resources and maximizing IHF throughput, considering these various factors, is an extremely challenging undertaking, one that may require balancing and coordinating the resources between them, the replenishment of resources, optimizing the underlying processes, controlling the unit flows, etc., especially considering that the operating conditions of an IHF evolve constantly over time. For example, in some cases, the unit traffic into the IHF and the unit dwell times may be so lopsided or imbalanced, that external sources may need to be engaged to replenish certain IHF resources. However, identifying such instances is a gargantuan challenge given that the replenishment cycles for the resources involved in IHF operations vary widely, ranging from hours to weeks, and the unit traffic into the IHF and the unit dwell times.

Current IHF management systems are simply not robust enough to handle the optimization of the IHF resources or to maximize IHF throughput in IHF operations, as these systems typically lack functionality to provide analysis of the unit volume, unit dwell time, the replenishment cycles of the various IHF resources, the interdependence between various IHF resources, and all the other factors that may affect the productivity and resource levels of the IHF during IHF operations. In addition, these current systems lack functionality to simulate or provide insights into IHF congestion, maximum possible throughput, short supply and bottlenecking IHF resources, surplus resources etc.

SUMMARY

The present disclosure achieves technical advantages as systems, methods, and computer-readable storage media that provide functionality for managing hub resources based on dual-stream resource optimization.

The present disclosure provides for a system integrated into a practical application with meaningful limitations as a system with functionality for optimizing the use of resources within a hub (e.g., train yard, intermodal yard, etc.) and for maximizing hub throughput based on a dual-stream resource optimization. In embodiments, the functionality for optimizing the use of resources within a hub and for maximizing hub throughput based on a dual-stream resource optimization may include functionality to represent a first flow of units through the hub (e.g., units arriving to the hub from customers to be loaded into departing trains) as a consolidation stream including a plurality of consolidation stages, and to represent a second flow of units through the hub (e.g., units arriving to the hub via arriving trains to be unloaded and delivered customers) as a deconsolidation stream including a plurality of deconsolidation stages. In embodiments, a time-space network may be generated for each of the consolidation and deconsolidation streams, as part of a dual-stream resource optimization (DSRO) model, in which each stage of the streams is represented as a node of the corresponding time-space network. In this manner, the DSRO model of embodiments may be able to pair stages (e.g., nodes) that compete and complement each other for hub resources, and may apply constraints along with current resource levels, ordered quantities of resources enroute to the hub, future deliveries of resources, etc., to optimize the use of the hub resources and to ensure that the resources are allocated to both streams fairly so as to maximize the unit flow during operations.

In embodiments, unit volumes expected to flow during a planning horizon of the time-space network through the consolidation and deconsolidation streams, and the corresponding dwell times, may be fed through the DSRO model to generate an optimized operating schedule configured to maximize throughput of the hub over the planning horizon by optimizing the use of the hub resources for the consolidation stream and the deconsolidation stream over the planning horizon timeframe and/or identifying changes (e.g., resource replenishment, changing train arrival times, etc.) that may be applied to ensure to execute the optimized operating schedule.

In this manner, the techniques described herein may provide an advantageous result that may allow a system to capture unit flows and dwell times through the hub over a planning horizon, and to generate an operating schedule that may achieve maximum unit flow through the train facility based on current resources levels and resource replenishment cycles (e.g., may provide an indication of additional resources that may be added). In particular embodiments, the techniques described herein may identify timeslots of the DRSO model planning horizon in which resources may be aplenty and timeslots in which resources may be lacking, and may enable operators to replenish or reposition the resources to optimize the use of the resources.

Thus, it will be appreciated that the technological solutions provided herein, and missing from conventional systems, are more than a mere application of a manual process to a computerized environment, but rather include functionality to implement a technical process to replace or supplement current manual solutions or non-existing solutions for managing devices in hubs. In doing so, the present disclosure goes well beyond a mere application the manual process to a computer. Accordingly, the claims herein necessarily provide a technological solution that overcomes a technological problem.

It is an object of the disclosure to provide a method of managing hub resources based on dual-stream resource optimization. It is a further object of the disclosure to provide a system for managing hub resources based on dual-stream resource optimization, and a computer-based tool for managing hub resources based on dual-stream resource optimization. These and other objects are provided by the present disclosure, including at least the following embodiments.

In one particular embodiment, a method of managing hub resources based on dual-stream resource optimization is provided. The method includes representing a first flow of units through the hub as a consolidation stream including a plurality of consolidation stages. In embodiments, units flowing through the consolidation stream are consolidated into one or more departing trains based, at least in part, on a destination of each of the units flowing through the consolidation stream. The method also includes representing a second flow of units through the hub as a deconsolidation stream including a plurality of deconsolidation stages. In embodiments, units flowing through the deconsolidation stream are deconsolidated from one or more arriving trains based, at least in part, on a destination of each of the units flowing through the deconsolidation stream. The method further includes obtaining first data associated with a first set of units flowing through the consolidation stream over a planning horizon timeframe. In embodiments, the first data includes a dwell time associated with each unit in the first set of units indicating a duration of time that each unit dwells within the hub, and a prediction of a volume of units in the first set of units using a first prediction model. The method also includes obtaining second data associated with a second set of units flowing through the deconsolidation stream over the planning horizon timeframe. In embodiments, the second data includes a volume of units in the second set of units, and a prediction of a dwell time associated with each unit in the second set of units indicating a duration of time that each unit dwells within the hub using a second prediction model. The method further includes generating, using a dual-stream optimization model, based on the first data and the second data, an optimized operating schedule configured to optimize at least one resource of the hub for the consolidation stream and the deconsolidation stream over the planning horizon timeframe, and generating a signal indicating one or more actions to be performed based on the optimized operating schedule.

In another embodiment, a system for managing hub resources based on dual-stream resource optimization is provided. The hub management system comprises at least one processor and a memory operably coupled to the at least one processor and storing processor-readable code that, when executed by the at least one processor, is configured to perform operations. The operations include representing a first flow of units through the hub as a consolidation stream including a plurality of consolidation stages. In embodiments, units flowing through the consolidation stream are consolidated into one or more departing trains based, at least in part, on a destination of each of the units flowing through the consolidation stream. The operations also include representing a second flow of units through the hub as a deconsolidation stream including a plurality of deconsolidation stages. In embodiments, units flowing through the deconsolidation stream are deconsolidated from one or more arriving trains based, at least in part, on a destination of each of the units flowing through the deconsolidation stream. The operations further include obtaining first data associated with a first set of units flowing through the consolidation stream over a planning horizon timeframe. In embodiments, the first data includes a dwell time associated with each unit in the first set of units indicating a duration of time that each unit dwells within the hub, and a prediction of a volume of units in the first set of units using a first prediction model. The operations also include obtaining second data associated with a second set of units flowing through the deconsolidation stream over the planning horizon timeframe. In embodiments, the second data includes a volume of units in the second set of units, and a prediction of a dwell time associated with each unit in the second set of units indicating a duration of time that each unit dwells within the hub using a second prediction model. The operations further include generating, using a dual-stream optimization model, based on the first data and the second data, an optimized operating schedule configured to optimize at least one resource of the hub for the consolidation stream and the deconsolidation stream over the planning horizon timeframe, and generating a signal indicating one or more actions to be performed based on the optimized operating schedule.

In yet another embodiment, a computer-based tool for managing hub resources based on dual-stream resource optimization is provided. The computer-based tool including non-transitory computer readable media having stored thereon computer code which, when executed by a processor, causes a computing device to perform operations. The operations include representing a first flow of units through the hub as a consolidation stream including a plurality of consolidation stages. In embodiments, units flowing through the consolidation stream are consolidated into one or more departing trains based, at least in part, on a destination of each of the units flowing through the consolidation stream. The operations also include representing a second flow of units through the hub as a deconsolidation stream including a plurality of deconsolidation stages. In embodiments, units flowing through the deconsolidation stream are deconsolidated from one or more arriving trains based, at least in part, on a destination of each of the units flowing through the deconsolidation stream. The operations further include obtaining first data associated with a first set of units flowing through the consolidation stream over a planning horizon timeframe. In embodiments, the first data includes a dwell time associated with each unit in the first set of units indicating a duration of time that each unit dwells within the hub, and a prediction of a volume of units in the first set of units using a first prediction model. The operations also include obtaining second data associated with a second set of units flowing through the deconsolidation stream over the planning horizon timeframe. In embodiments, the second data includes a volume of units in the second set of units, and a prediction of a dwell time associated with each unit in the second set of units indicating a duration of time that each unit dwells within the hub using a second prediction model. The operations further include generating, using a dual-stream optimization model, based on the first data and the second data, an optimized operating schedule configured to optimize at least one resource of the hub for the consolidation stream and the deconsolidation stream over the planning horizon timeframe, and generating a signal indicating one or more actions to be performed based on the optimized operating schedule.

The foregoing has outlined rather broadly the features and technical advantages of the present disclosure in order that the detailed description of the disclosure that follows may be better understood. Additional features and advantages of the disclosure will be described hereinafter which form the subject of the claims of the disclosure. It should be appreciated by those skilled in the art that the conception and specific embodiment disclosed may be readily utilized as a basis for modifying or designing other structures for carrying out the same purposes of the present disclosure. It should also be realized by those skilled in the art that such equivalent constructions do not depart from the spirit and scope of the disclosure as set forth in the appended claims. The novel features which are believed to be characteristic of the disclosure, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

For a more complete understanding of the present disclosure, reference is now made to the following descriptions taken in conjunction with the accompanying drawings, in which.

Figure 1:
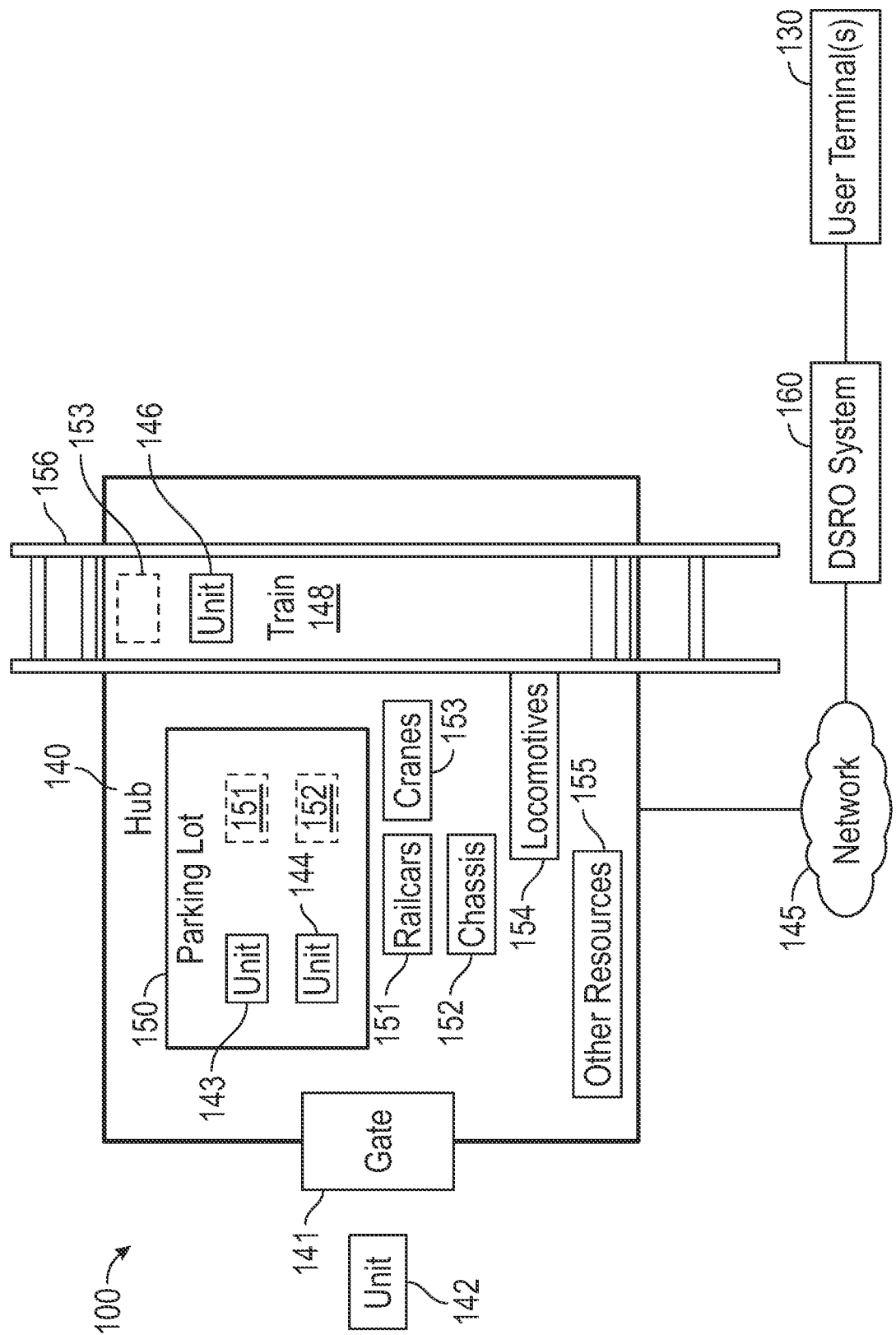
FIG. 1 is a block diagram of an exemplary system configured with capabilities and functionality for managing resources of a hub based on dual-stream resource optimization in accordance with embodiments of the present disclosure.

It should be understood that the drawings are not necessarily to scale and that the disclosed embodiments are sometimes illustrated diagrammatically and in partial views. In certain instances, details which are not necessary for an understanding of the disclosed methods and apparatuses or which render other details difficult to perceive may have been omitted. It should be understood, of course, that this disclosure is not limited to the particular embodiments illustrated herein.

DETAILED DESCRIPTION

The disclosure presented in the following written description and the various features and advantageous details thereof, are explained more fully with reference to the non-limiting examples included in the accompanying drawings and as detailed in the description. Descriptions of well-known components have been omitted to not unnecessarily obscure the principal features described herein. The examples used in the following description are intended to facilitate an understanding of the ways in which the disclosure can be implemented and practiced. A person of ordinary skill in the art would read this disclosure to mean that any suitable combination of the functionality or exemplary embodiments below could be combined to achieve the subject matter claimed. The disclosure includes either a representative number of species falling within the scope of the genus or structural features common to the members of the genus so that one of ordinary skill in the art can recognize the members of the genus. Accordingly, these examples should not be construed as limiting the scope of the claims.

A person of ordinary skill in the art would understand that any system claims presented herein encompass all of the elements and limitations disclosed therein, and as such, require that each system claim be viewed as a whole. Any reasonably foreseeable items functionally related to the claims are also relevant. The Examiner, after having obtained a thorough understanding of the disclosure and claims of the present application has searched the prior art as disclosed in patents and other published documents, i.e., nonpatent literature. Therefore, as evidenced by issuance of this patent, the prior art fails to disclose or teach the elements and limitations presented in the claims as enabled by the specification and drawings, such that the presented claims are patentable under the applicable laws and rules of this jurisdiction.

Various embodiments of the present disclosure are directed to systems and techniques that provide functionality for managing hub resources based on dual-stream resource optimization. In embodiments, the functionality for optimizing the use of resources within a hub and for maximizing hub throughput based on a dual-stream resource optimization may include functionality to represent a first flow of units through the hub (e.g., units arriving to the hub from customers to be loaded into departing trains) as a consolidation stream including a plurality of consolidation stages, and to represent a second flow of units through the hub (e.g., units arriving to the hub via arriving trains to be unloaded and delivered customers) as a deconsolidation stream including a plurality of deconsolidation stages. In embodiments, a time-space network may be generated for each of the consolidation and deconsolidation streams, as part of a dual-stream resource optimization (DSRO) model, in which each stage of the streams is represented as a node of the corresponding time-space network. In this manner, the DSRO model of embodiments may be able to pair stages (e.g., nodes) that compete and complement each other for hub resources, and may apply constraints along with current resource levels, ordered quantities of resources enroute to the hub, future deliveries of resources, etc., to optimize the use of the hub resources and to ensure that the resources are allocated to both streams fairly so as to maximize the unit flow during operations.

In embodiments, unit volumes expected to flow during a planning horizon of the time-space network through the consolidation and deconsolidation streams, and the corresponding dwell times, may be fed through the DSRO model to generate an optimized operating schedule configured to maximize throughput of the train yard over the planning horizon by optimizing the use of the hub resources for the consolidation stream and the deconsolidation stream over the planning horizon timeframe and/or identifying changes (e.g., resource replenishment, changing train arrival times, etc.) that may be applied to ensure to execute the optimized operating schedule.

It is noted that the description that follows focuses on operations of a hub (e.g., an intermodal hub facility (IHF)) in which goods received from customers are placed into trains and transported to their respective destinations using resources of the hub, and/or trains carrying goods are received and unloaded for eventual pickup by customers using the resources of the hub. However, the techniques described herein may be applicable in any application in which resources may be used in different operations, and where the use of the resources may be shared (e.g., collaborative or competing) such that optimization of the use of the resources may yield a better throughput for the system.

FIG. 1 is a block diagram of an exemplary system 100 configured with capabilities and functionality for managing resources of a hub based on dual-stream resource optimization in accordance with embodiments of the present disclosure. As shown in FIG. 1, system 100 may include user terminal 130, hub 140, network 145, and DSRO system 160. These components, and their individual components, may cooperatively operate to provide functionality in accordance with the discussion herein.

It is noted that the functional blocks, and components thereof, of system 100 of embodiments of the present disclosure may be implemented using processors, electronics devices, hardware devices, electronics components, logical circuits, memories, software codes, firmware codes, etc., or any combination thereof. For example, one or more functional blocks, or some portion thereof, may be implemented as discrete gate or transistor logic, discrete hardware components, or combinations thereof configured to provide logic for performing the functions described herein. Additionally, or alternatively, when implemented in software, one or more of the functional blocks, or some portion thereof, may comprise code segments operable upon a processor to provide logic for performing the functions described herein.

It is also noted that various components of system 100 are illustrated as single and separate components. However, it will be appreciated that each of the various illustrated components may be implemented as a single component (e.g., a single application, server module, etc.), may be functional components of a single component, or the functionality of these various components may be distributed over multiple devices/components. In such embodiments, the functionality of each respective component may be aggregated from the functionality of multiple modules residing in a single, or in multiple devices.

It is further noted that functionalities described with reference to each of the different functional blocks of system 100 described herein is provided for purposes of illustration, rather than by way of limitation and that functionalities described as being provided by different functional blocks may be combined into a single component or may be provided via computing resources disposed in a cloud-based environment accessible over a network, such as one of network 145.

Hub 140 may represent a hub (e.g., an IHF, etc.) in which units (e.g., containers/trailers carrying goods) are processed as part of the transportation of the unit. For example, units being transported to another destination may be loaded into an appropriate departing train and units arriving in a train may be unloaded from the train for delivery to customers. In particular, hub 140 may be described functionally by describing the complex operations of hub 140 as comprising two distinct flows. Units flowing through a first flow (e.g., an in-gate flow) may be received through gate 141 from various customers and may eventually be loaded into an appropriate departing train. For example, customers may drop off individual units (e.g., unit 142) at hub 140. The individual units may be transported by the customers using various chassis (e.g., trucks) that may enter hub 140 through gate 141 carrying the units. The arriving first flow units may be destinated for different destinations, and may be dropped off at hub 140 at various times of the day or night. As part of the first flow, the first flow units arriving at hub 140 may be unloaded (e.g., using a crane) from the trucks (or from whatever chassis in which they were transported into hub 140) and may be parked or deposited in parking spaces (e.g., of parking lot 150). The first flow units may eventually be loaded onto a departing train to be taken to their destination.

For example, unit 142 may be currently being dropped off into hub 140 by a customer, and may be destined to a first destination. In this case, as part of the first flow, unit 142 may be in-gated into hub 140 and may be parked in a parking space within parking lot 150. Currently, parking spaces 151 and 152 may be available and so unit 142 may be assigned to one of these parking spaces. In this same example, unit 143 may have been previously dropped off into hub 140 by a customer (e.g., the same customer or a different customer) and may be destined to some destination (e.g., the first destination or a different destination). In this example, train 148 may be bound to the first destination. In this case, unit 142, as part of the first flow, may eventually be loaded onto train 148. As can be seen, currently, train 148 may have a space 153 available to receive unit 142. Unit 143 may also be loaded onto train 148 as part of the first flow when unit 143 is destined for the first destination. As part of the first flow, unit 142 (and unit 143 when destined for the first destination) may eventually leave hub 140 onboard train 148 when train 148 departs to the first destination. In this manner, the first flow may operate to receive various units from various customers and consolidate them into departing trains based on the destination of the units to be transported to their respective destinations.

Units flowing through a second flow (e.g., an inbound flow) may arrive at hub 140 via an arriving train (e.g., train 148 over railroad 156) carrying the second flow units and may eventually be unloaded from the arriving train to be made available for delivery to (e.g., for pickup by) customers. For example, units 144 and 146 may originate from an origination and may arrive at hub 140 via train 148 over railroad 156) carrying these and in some embodiments many other units. The second flow units arriving at hub 140 may be consigned to different and/or various customers. For example, units 144 and 146 may be consigned to one or more customers. After arrival via train 148, the second flow units may be unloaded (e.g., using a crane) from train 148 and may be placed or parked (e.g., using various chassis) in parking spaces (e.g., of parking lot 150). For example, unit 144 may be unloaded from train 148 and may be parked in a parking lot of parking spaces 144. Unit 146 may also be eventually unloaded from train 148 and may be parked on one of the available parking spaces (e.g., parking space 151 or 152). The unloaded second flow units may eventually be picked up by respective customers and may exit or leave hub 140. In this manner, the second flow may operate to receive a train carrying various units, to deconsolidate the train into the various units, and to make the units available for delivery to the respective customers.

In embodiments, processing the units through the first flow and the second flow may involve the use of a wide variety of resources to consolidate the units from customers into departing trains and/or to deconsolidate arriving trains into units for delivery to customers. These resources may include hub personnel (hostler drivers, crane operators, etc.), parking spaces, chassis, hostlers, cranes, tracks, railcars, locomotives, etc. These resources may be used to facilitate holding and/or moving the units through the operations of the hub. For example, parking lot 150 may be used to park units while the units are waiting to be loaded onto departing trains or waiting to be picked up by customers. Chassis 152 (e.g., including hostlers, trucks, forklifts, etc.), and operators of chassis 152, may be used to move units within hub 140, such as moving unloaded units from a arriving trains to parking lot 150, and/or to move units from parking spaces 152 to departing trains, as necessary. Cranes 153 may be used to load units onto departing trains (e.g., to unload units from chassis 152 and load the units onto the departing trains), and/or to unload units from arriving trains (e.g., e.g., to unload units from arriving trains and load the units onto chassis 152). Railcars 151 may be used to transport the units in the train. For example, a train may be composed of one or more railcars, and the units may be loaded onto the railcars for transportation. Arriving trains may include one or more railcars including units that may be processed through the second flow, and departing trains may include one or more railcars including units that may have been processed through the first flow. Railcars 151 may be assembled together to form a train. Locomotives 154 may include engines that may be used to power a train. Other resources 155 may include other resources not explicitly mentioned herein but configured to allow or facilitate units to be processed through the first flow and/or the second flow.

In embodiments, the first and second flows may, in some situations, compete for the hub resources, and, in other situation, may complement each other in the use of the resources. In addition, the use of the resources may be related to the volume of units being processed by hub 140 (e.g., processed through the first and/or second flow), as more units processed may mean an increased use of resources. In addition, the throughput (e.g., the rate of units processed over time) of hub 140 may depend on the efficiency in the use of resources, the volume of the units being processed, and the dwell time of the units within hub 140.

User terminal 130 may include a mobile device, a smartphone, a tablet computing device, a personal computing device, a laptop computing device, a desktop computing device, a computer system of a vehicle, a personal digital assistant (PDA), a smart watch, another type of wired and/or wireless computing device, or any part thereof. In embodiments, user terminal 130 may provide a user interface that may be configured to provide an interface (e.g., a graphical user interface (GUI)) structured to facilitate an operator interacting with system 100, e.g., via network 145, to execute and leverage the features provided by server 110. In embodiments, the operator may be enabled, e.g., through the functionality of user terminal 130, to provide configuration parameters that may be used by system 100 to provide functionality for managing operations of hub 140 in accordance with embodiments of the present disclosure. In embodiments, user terminal 130 may be configured to communicate with other components of system 100.

In embodiments, network 145 may facilitate communications between the various components of system 100 (e.g., hub 140, DSRO system 160, and/or user terminal 130). Network 145 may include a wired network, a wireless communication network, a cellular network, a cable transmission system, a Local Area Network (LAN), a Wireless LAN (WLAN), a Metropolitan Area Network (MAN), a Wide Area Network (WAN), the Internet, the Public Switched Telephone Network (PSTN), etc.

DSRO system 160 may be configured to provide the main functionality of system 100 to manage resources of hub 140 based on a dual-stream resource optimization to maximize throughput through hub 140 in accordance with embodiments of the present disclosure. In embodiments, DSRO system 160 may be configured to facilitate synchronization of the first and second flows to maximize the throughput of hub 140 and to optimize resource utilization of the resources of hub 140. In particular, DSRO system 160 may be configured to represent the first and second flows as a time-expanded network (e.g., of a DSRO model) to model the unit flows and dwell times through the hub over a planning horizon, and to apply the DSRO model to achieve maximum unit flow through hub 140. The DSRO model may identify timeslots within the planning horizon when resources are aplenty and timeslots when the hub 140 may face resource deficits or shortages to enable operators to replenish or reposition the resources to mitigate or avoid the shortages.

Figure 2:
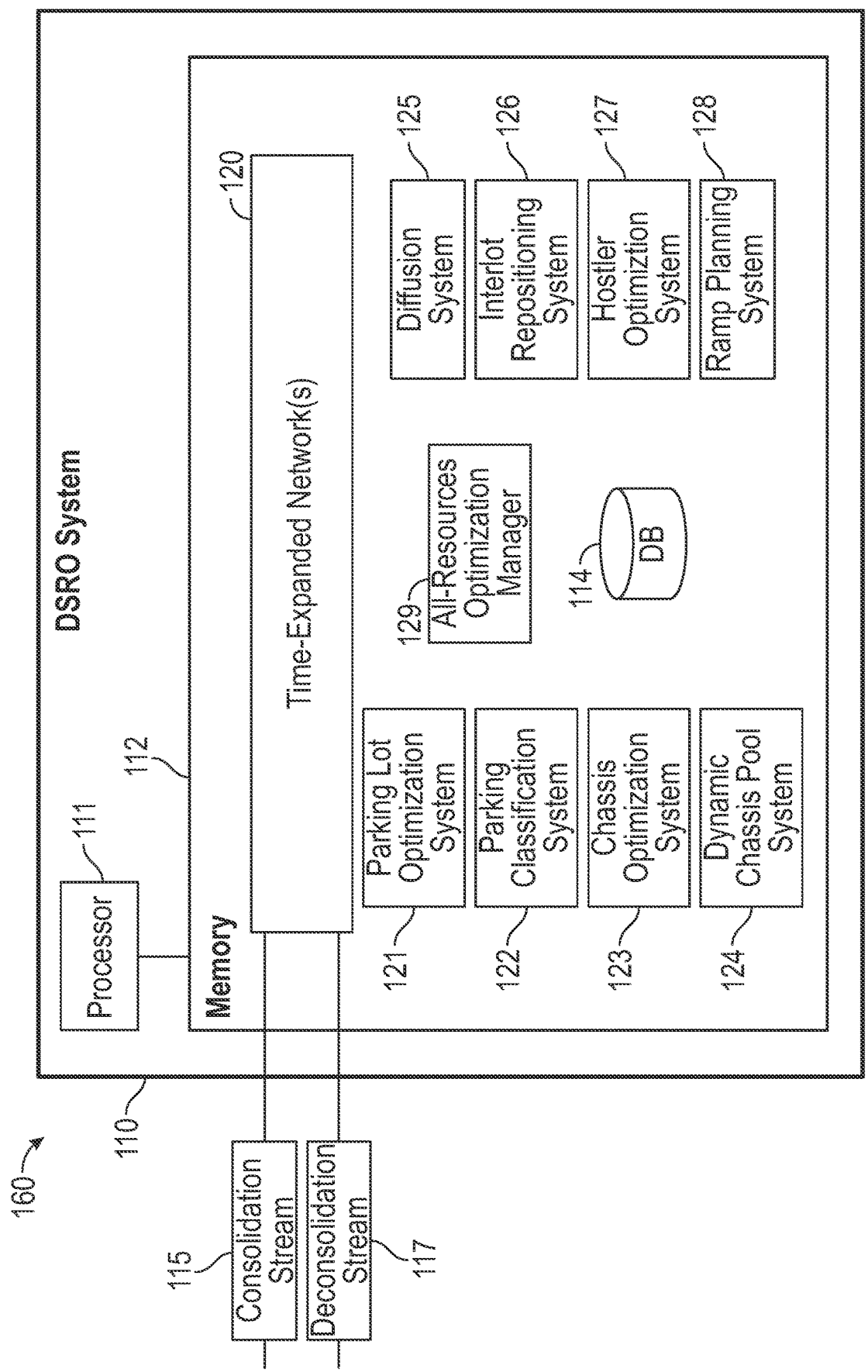
FIG. 2 is a block diagram illustrating an example of dual-stream resource optimization (DSRO) system configured with capabilities and functionality for managing resources of a hub based on a dual-stream resource optimization to maximize throughput through the hub in accordance with embodiments of the present disclosure.

FIG. 2 is a block diagram illustrating an example of DSRO system 160 configured with capabilities and functionality for managing resources of a hub based on a dual-stream resource optimization to maximize throughput through the hub in accordance with embodiments of the present disclosure. As shown in FIG. 2, DSRO system 160 may be implemented in a server (e.g., server 110). In embodiments, functionality of server 110 to facilitate operations of DSRO system 160 may be provided by the cooperative operation of the various components of server 110, as will be described in more detail below.

It is noted that although FIG. 2 shows server 110 as a single server, it will be appreciated that server 110 (and the individual functional blocks of server 110) may be implemented as separate devices and/or may be distributed over multiple devices having their own processing resources, whose aggregate functionality may be configured to perform operations in accordance with the present disclosure. Furthermore, those of skill in the art would recognize that although FIG. 2 illustrates components of server 110 as single and separate blocks, each of the various components of server 110 may be a single component (e.g., a single application, server module, etc.), may be functional components of a same component, or the functionality may be distributed over multiple devices/components. In such embodiments, the functionality of each respective component may be aggregated from the functionality of multiple modules residing in a single, or in multiple devices. In addition, particular functionality described for a particular component of server 110 may actually be part of a different component of server 110, and as such, the description of the particular functionality described for the particular component of server 110 is for illustrative purposes and not limiting in any way.

As shown in FIG. 2, server 110 includes processor 111, memory 112, time-expanded network 120, parking lot optimization system 121, parking classification system 122, chassis optimization system 123, dynamic chassis pools system 124, diffusion system 125, interlot repositioning system 126, hostler optimization system 127, ramp planning system 128, all-resources optimization manager 129, and database 114.

Processor 111 may comprise a processor, a microprocessor, a controller, a microcontroller, a plurality of microprocessors, an application-specific integrated circuit (ASIC), an application-specific standard product (ASSP), or any combination thereof, and may be configured to execute instructions to perform operations in accordance with the disclosure herein. In some embodiments, implementations of processor 111 may comprise code segments (e.g., software, firmware, and/or hardware logic) executable in hardware, such as a processor, to perform the tasks and functions described herein. In yet other embodiments, processor 111 may be implemented as a combination of hardware and software. Processor 111 may be communicatively coupled to memory 112.

Memory 112 may comprise one or more semiconductor memory devices, read only memory (ROM) devices, random access memory (RAM) devices, one or more hard disk drives (HDDs), flash memory devices, solid state drives (SSDs), erasable ROM (EROM), compact disk ROM (CD-ROM), optical disks, other devices configured to store data in a persistent or non-persistent state, network memory, cloud memory, local memory, or a combination of different memory devices. Memory 112 may comprise a processor readable medium configured to store one or more instruction sets (e.g., software, firmware, etc.) which, when executed by a processor (e.g., one or more processors of processor 111), perform tasks and functions as described herein.

Memory 112 may also be configured to facilitate storage operations. For example, memory 112 may comprise database 114 for storing various information related to operations of system 100. For example, database 114 may store configuration information related to operations of DSRO system 160. In embodiments, database 114 may store information related to various models used during operations of DSRO system 160. Database 114 is illustrated as integrated into memory 112, but in some embodiments, database 114 may be provided as a separate storage module or may be provided as a cloud-based storage module. Additionally, or alternatively, database 114 may be a single database, or may be a distributed database implemented over a plurality of database modules.

As mentioned above, synchronizing the processing of units through the first flow and the second flow in a hub is a complex process and may be influenced by various factors. For example, in some cases, the unit traffic through the hub and the unit dwell times may be so lopsided or imbalanced, that the current resources (e.g., the current resource inventory) may not be able to handle the unit traffic efficiently without replenishment of the resources. In some cases, replenishing a resource may not be straightforward, however, as the replenishment cycles of different resources may be different and may not be able to be performed within an acceptable timeframe. For example, in some cases second flow units needing a chassis may outnumber the chassis currently available within the hub, in which cases a replenishment from an external source may be needed. However, the lead time to obtain additional chassis may be a multi-day effort, and operators may need to request the additional chassis in advance. The replenishment cycle of railcars may be much longer as railcars may have to be sourced from other locations across the railroad network, or may have to be ordered from a lessor. The replenishment cycle of hostlers may be a multi-days to multi-weeks effort.

The replenishment cycle of locomotives could be multi-days to multi-weeks, as locomotives may have to be released from shops or mobilized from other locations. The replenishment cycle of parking spaces is even longer, as additional parking spaces cannot be created instantly, and may require an expensive and time-consuming effort. In some cases, if the hub is landlocked, adding new parking spaces may not be possible. Alternatively, some parking spaces that are reinforced may be converted into stack lots. The replenishment cycle of cranes (or upgrading an existing crane to add lift capacity) may include a multi-year effort and may be capital-intensive, a subject to regulatory oversight and clearances in some cases. The replenishment cycle of hostlers may be a multi-days to multi-weeks effort. The replenishment cycle of operators may also be considerable, since staff may have to be recruited to augment the current personnel roster, and may have to be onboarded and trained.

Considering the wide range of replenishment cycles of the various resources of a hub, the interdependencies of the various resources (e.g., how the various resources compete and/or collaborate for resources at different stages of the streams), and the variable nature of unit volume and dwell time of units within a hub, it is quite humanly impossible to plan and allocate all the resources involved in the first and second unit flows optimally to perform hub operations efficiently. However, a DSRO system implemented in accordance with the present embodiments provides a solution.

In embodiment, DSRO system 160 may be configured to represent the first flow of units (e.g., an in-gate flow in which units may be received from various customers and may be consolidated by destinations into departing trains) as consolidation stream 115 including a plurality of stages. In embodiments, each stage of consolidation stream 115 may represent different operations or events that may be performed or occur to facilitate the flow of the first flow units through the hub. In embodiment, DSRO system 160 may be configured to represent the second flow of units (e.g., an inbound flow in which an arriving train may be deconsolidated by unloading units from the arriving train and the units are made available for delivery to customers) as deconsolidation stream 117 including a plurality of stages. In embodiments, each stage of deconsolidation stream 117 may represent different operations or events that may be performed or occur to facilitate the flow of the second flow units through the hub.

As mentioned above, resources of the hub may be shared between consolidation stream 115 and deconsolidation stream 117 (e.g., in a collaborative or competing interaction). In embodiments, as will be discussed in more detail below, DSRO system 160 may generate time-space networks for the DSRO model based on the representations (e.g., stages) of the consolidation stream 115 and deconsolidation stream 117. The configuration of the consolidation stream 115 and deconsolidation stream 117, as well as their interaction with respect to shared resources use, will now be discussed with respect to FIG. 3.

Figure 3:
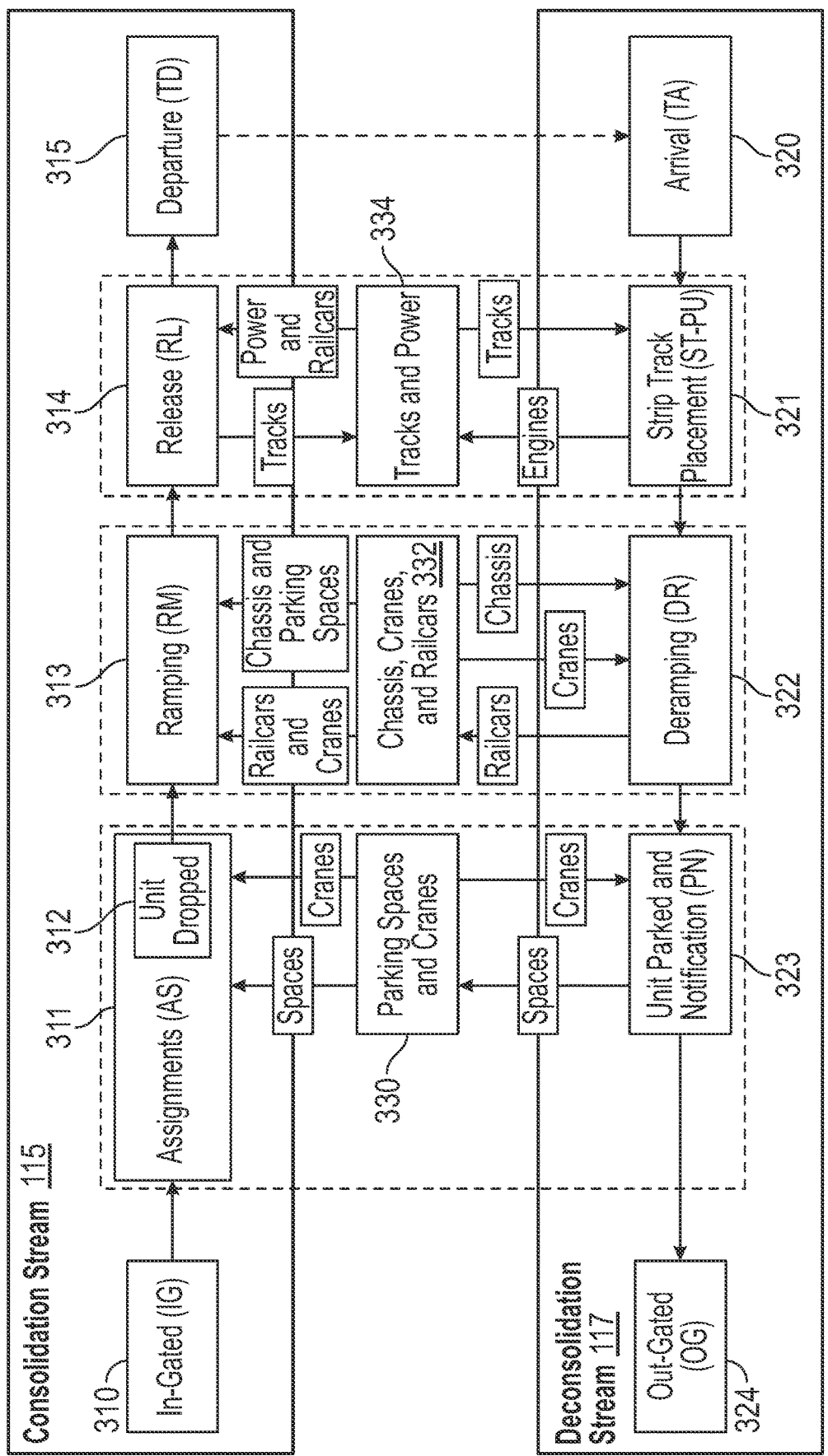
FIG. 3 is a block diagram illustrating an example configuration of a consolidation stream and deconsolidation stream in accordance with embodiments of the present disclosure.

FIG. 3 is a block diagram illustrating an example configuration of a consolidation stream and deconsolidation stream in accordance with embodiments of the present disclosure. As shown in FIG. 3, consolidation stream 115 may be configured to include a plurality of stages, namely in-gated (IG) stage 310, assignment (AS) stage 311, ramping (RM) stage 313, release (RL) stage 314, and departure (TD) stage 315. Deconsolidation stream 115 may be configured to include a plurality of stages, namely arrival (TA) stage 320, strip track placement (ST-PU) stage 321, de-ramping (DR) stage 322, unit park and notification (PN) stage 323, and out-gated (OG) stage 324.

With respect to consolidation stream 115, each of the stages of consolidation stream 115 may represent an event or operations that may be performed or occur to facilitate the flow of a unit through the consolidation stream 115. At IG stage 310, a unit may be received or in-gated into the hub. For example, at IG stage 310, a unit may be in-gated from a customer, and the unit may be destined for a particular destination. The resources involved at IG stage 310 may include chassis, as the in-gated unit may be transported into the hub using a chassis. In this case, the chassis may be considered and addition to the resources of the hub, and IG stage 310 may be considered aa supplier of chassis to the resources of hub 140.

At AS stage 311, the unit may be assigned to a parking space to be placed in the parking space while awaiting processing by the next stage. In this case, the operator may assign the unit to a particular parking space. The assignment of the parking space by the operator may be based on available parking spaces, and in some embodiments, may be based on DSRO functionality to optimize the parking operations within the hub. At 312, the unit may be dropped at the assigned parking space. It is noted that, in this exemplary representation of consolidation stream 315, the event of dropping the unit into the assigned parking space may not be represented as a stage of consolidation stream 315. However, in some embodiments, dropping the unit into the assigned parking space may be represented as a stage of consolidation stream 315. The resources involved at AS stage 311, such as when the unit may be dropped onto the parking space may include parking spaces and cranes. For example, as shown in FIG. 3, AS stage 311 use a parking space for parking the unit, and may use a crane to place the unit into the parking space. In some embodiments, the parking spaces to which units may be assigned during AS stage 311 may be within the hub, may be trackside, or may be offsite from the hub.

At RM stage 313 the unit may be loaded, from the parking space in which the unit may currently be parked, onto a railcar. In embodiment, the unit may be assigned to a railcar of a departing train, such as based on the unit's destination and/or the desired delivery time, such as based on a scheduled train lineup. In particular embodiments, RM stage 313 may operate to consolidate units with a same destination (or with a destination that within a particular route) into a single train based on their destination. In this case, operations at RM stage 313 may be affected by resources including cranes, hostlers, railcars, parking lots, and chassis. For example, as shown in FIG. 3, during the RM stage 313, railcars to which units may be assigned may be retrieved and positioned on productions tracks with loading capabilities. The departing train may then be loaded by loading the units onto the railcars of the train using cranes. With respect to a unit, during the RM stage, the unit may be removed from the parking space, hauled by a hostler to its assigned railcar, and may be loaded onto the railcar using a crane. If the unit is a container mounted on a chassis, loading the unit onto the railcar may release a chassis (e.g., making the chassis available for use). In addition, as shown in FIG. 3, removing the unit form the parking space frees up the parking space to be used to park another unit. In this manner, the resources involved at RM stage 313 may include parking spaces, cranes, hostlers, railcars, and/or chassis.

At RL stage 314, the train may be assembled and loaded and be released for departure from the hub. The resources involved at RL stage 314 may include tracks, railcars, and locomotives. For example, RL stage 314 may release a track (e.g., the off-spot track to which the train is assigned) to make it available, but may use a production track to depart the hub, as well as railcars (e.g., the railcars assigned to the train) and locomotives (e.g., the locomotive(s) used to move the train). At TD stage 315, the train departs the hub. TD stage 314 may release a production track, but may use the railcars and locomotives that are part of the departing train.

With respect to deconsolidation stream 117, each of the stages of deconsolidation stream 117 may represent an event or operations that may be performed or occur to facilitate the flow of a unit through deconsolidation stream 117. At TA stage 320, an arriving train arrives to the hub. The arriving train may include railcars carrying units. With respect to a unit, a unit may be carried by a railcar of the arriving train. In embodiments, the resources involved in TA stage 320 may include offsite and non-production tracks (e.g., over which the arriving train arrives).

At ST-PU stage 321, the arriving train may be spotted and placed on a production track. As shown in FIG. 3, the resources involved in ST-PU stage 321 may include the production tracks used to place the train, the locomotive used to power the train into the production track, and the railcars that are part of the arriving train. In particular, the locomotive(s) used to bring the bring the arriving train to the hub may now be released from deconsolidation stream 117, since the train has arrived at the hub and the locomotive is no longer used in deconsolidation stream 117.

At DR stage 322, the units in the railcars of the arriving train may be unloaded from the arriving train. In embodiments, unloading (e.g., or deramping) the units from the arriving train may include unloading the units to be placed in a parking space. In embodiments, the deramping the units from the arriving trains may include the use of cranes to unload the units from the arriving train, hostlers to haul the units to their assigned parking space, and the parking spaces to which the units may be assigned. DR stage 322 may also involve the use of chassis to put the unloaded units (containers), and railcars that are made available after units are unloaded from the railcars.

At PN stage 323, the unit is placed in the assigned parking space and the customer is notified of the availability of the unit for pickup. The PN stage 323 may involve the use of parking spaces while the unit is waiting to be picked up, but the parking space may be released once the customer picks it up. In some cases, the unit may be placed on a chassis and a crane may be used to lift the unit from the parking space to be loaded onto a truck (i.e. flip) for delivery to the customer. At OG stage 324, the customer may pick up the unit from the parking space and the unit may leave the hub.

As shown in FIG. 3, the interaction of consolidation stream 115 and deconsolidation stream 117, with respect to the use of resources of the hub, may be collaborative or competing. For example, parking spaces may be used to park units processed through AS stage 312 of consolidation stream 115 while the units are waiting to be ramped (e.g., processed through RM stage 313). However, parking spaces may also be used to park units processed through DR stage 322 of deconsolidation stream 117 (e.g., units unloaded from an arriving train, while these units are waiting to be picked up by a customer (e.g., while being processed through PN stage 323). In this manner, consolidation stream 115 and deconsolidation stream 117 may compete for the use of parking spaces within the hub.

In another example, during RM stage 313, consolidation stream 115 may compete for hostlers, cranes, and chassis with deconsolidation stream 117, during DR stage 322, as both stages may use hostlers, cranes, and chassis to perform the operations. In this manner, consolidation stream 115 and deconsolidation stream 117 may compete for the use of hostlers, cranes, and chassis within the hub. In another example, Chassis may be needed by the consolidation stream only when the units are stacked and needed to be loaded onto chassis to be ramped. However, it is noted that once the ramping operations are complete (e.g., once RM stage 313 is completed) and departing train departs (e.g., at TD stage 315), a production track may be released by consolidation stream 115, which may be used to spot an arriving train (e.g., at ST-PU stage 321) through deconsolidation stream 117. In this manner, consolidation stream 115 and deconsolidation stream 117 may complement each other for the use of production tracks. Table 1 below provides an example of resource interdependency between consolidation stream 115 and deconsolidation stream 117, as illustrated in the representation in FIG. 3.

TABLE 1

Resource Interdependencies between Consolidation and Deconsolidation Streams

| Resource | Deconsolidation Stream | | Consolidation Stream | | Interaction |
|---|---|---|---|---|---|
| | Supplier | Consumer | Supplier | Consumer | |
| Chassis | | x | x | | Collaborative |
| Parking Spaces | | x | | x | Competitive |
| Cranes | | x | | x | Competitive |
| Hostlers | | x | | x | Competitive |
| Strip Tracks | | x | x | | Collaborative |
| Railcars | x | | | x | Collaborative |
| Locomotives | x | | | x | Collaborative |

With reference back to FIG. 2, DSRO system 160 may be configured to maximize the throughput of the hub (e.g., the rate of units processed through the hub) by generating one or more time-space networks 120 to represent consolidation stream 115 and deconsolidation stream 117, and configuring the DSRO model to use one or more time-space networks 120, over a planning horizon, to optimize the use of the resources of the hub that support the unit flow within the planning horizon to maximize the throughput over the planning horizon. In embodiments, the DSRO model may generate, based on the one or more time-space networks 120, an optimized operating schedule that includes one or more of a determined unit flow through one or more of the stages of each time-space network (e.g., the consolidation and/or deconsolidation stream time-space networks) at each time increment of the planning horizon, and indication of a resource deficit or overage at one or more of the stages of each time-space network at each time increment of the planning horizon, and/or an indication or recommendation of a resource replenishment to be performed at one or more of the stages of each time-space network at each time increment of the planning horizon to ensure the optimized operating schedule is met. The result is a powerful overview of the planning horizon with respect to unit volume and resource consumption that may enable an operator to determine not only the expected unit traffic through the hub over the planning horizon, but the rate of resource consumption in an optimized manner (e.g., as optimized by the DSRO model) and ways to ensure that the optimum utilization of resources to ensure maximum throughput through the hub is achieved.

In embodiments, DSRO system 160 may generate one or more time-space networks 120 using the stages of consolidation stream 115 and deconsolidation stream 117. In particular, DSRO system 160 may define the nodes of a time-space network to represent the stages of the corresponding stream, and the edges between the nodes to represent the capacity. The time-increment may be variable and configurable, and may represent, for example, a particular timeframe, such as an hour, a multi-hour block, a shift, etc. The time dimension of the time-space networks may facilitate determination of the connectivity among the nodes, and flow between the nodes may be constrained to take place only under plausible operating conditions. The time-increment may be variable and configurable, and may represent, for example, a particular timeframe, such as an hour, a multi-hour block, a shift, etc. For example, if a stacked unit requires more than one time increment (e.g., e.g., more than one timeslot of the time-space network) to be retrieved from the stack before a customer may be able to out-gate it (e.g., at the OG stage 324 as described with reference to FIG. 3), then the edge between a PN stage and an OG stage of the time-space network may be constrained to be other than non-zero for that unit.

Figure 4A:
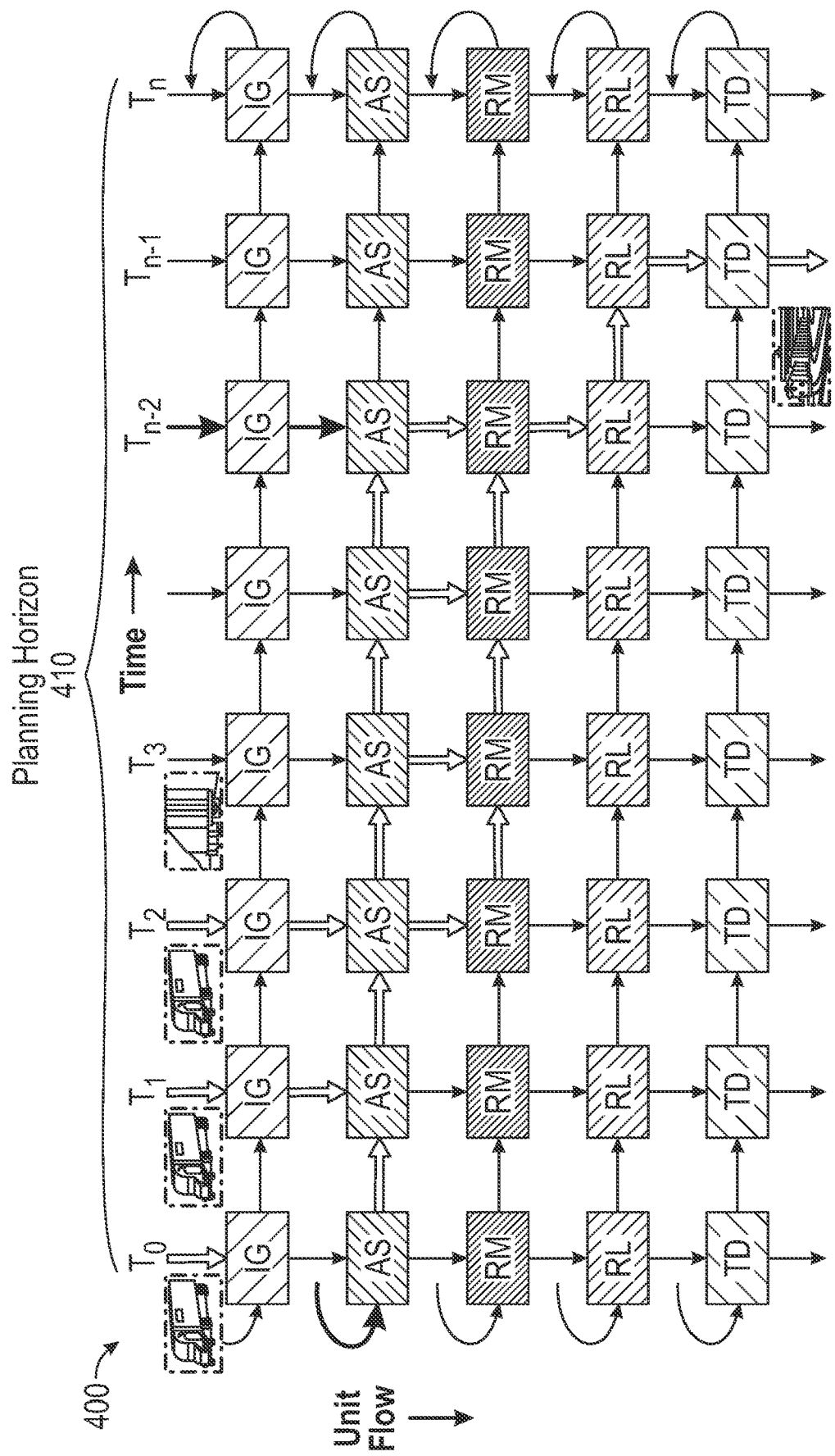
FIG. 4A shows a block diagram of an exemplary time-space network representing a consolidation stream over a planning horizon in accordance with embodiments of the present disclosure.
Figure 4B:
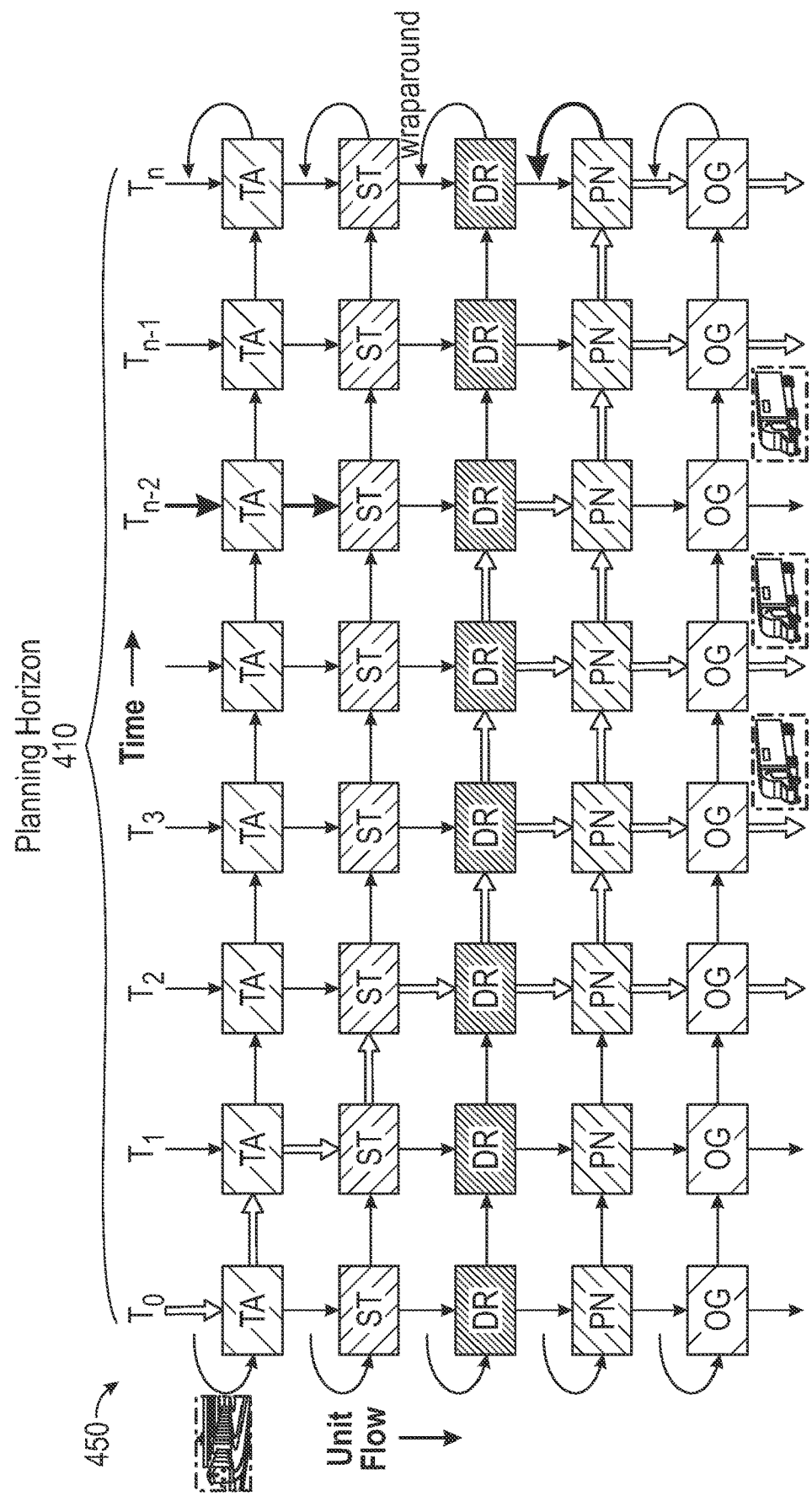
FIG. 4B shows a block diagram of an exemplary time-space network representing a deconsolidation stream over a planning horizon in accordance with embodiments of the present disclosure.

As noted above, DSRO system 160 may generate a time-space network using the stages of consolidation stream 115 and a time-space network using the stages of deconsolidation stream 117. FIG. 4A shows a block diagram of an exemplary time-space network 400 representing a consolidation stream over a planning horizon in accordance with embodiments of the present disclosure. FIG. 4B shows a block diagram of an exemplary time-space network 450 representing a deconsolidation stream over a planning horizon in accordance with embodiments of the present disclosure.

As shown in FIG. 4A, time-space network 400 may be generated using the stages of consolidation stream 115, expanded over a planning horizon, which may run at time increments from $T_0$ to $T_n$. At each time increment, units may be processed through the represented consolidation stream, and as such, each time increment may offer a snapshot of the consolidation stream at the corresponding time of the planning horizon. In embodiments, each of the nodes of time-space network 400 may represent events or operations of consolidation stream 115 (e.g., as described with respect to FIG. 3) and the edges of the time-space network 400 may represent the interactions between the events or operations.

In embodiments, as units flow through the consolidation stream over the planning horizon, the flow may be represented or captured by time-space network 400 as unit flow between the successive stages of the consolidation stream over each of the time increments. In the particular example illustrated in FIG. 4A, units may flow into the IG stage of the consolidation stream at $T_0$, $T_1$, and $T_2$, (e.g., different units may be brought into the hub to be processed and consolidated into departing trains) and may exit the consolidation stream at $T_{n-1}$ (e.g., may leave the hub in a departing train). In embodiments, the number of units entering the consolidation stream at different time increments may be different. For example, the number of units entering the IG stage of the consolidation stream at $T_2$ may be greater than the number of units entering the IG stage of the consolidation stream at $T_1$, as represented by the larger arrow.

As shown in FIG. 4B, time-space network 450 may be generated using the stages of deconsolidation stream 117, expanded over the planning horizon, which may run at time increments from $T_0$ to $T_n$. At each time increment, units may be processed through the represented deconsolidation stream, and as such, each time increment may offer a snapshot of the deconsolidation stream at the corresponding time of the planning horizon. In embodiments, each of the nodes of time-space network 450 may represent events or operations of deconsolidation stream 117 (e.g., as described with respect to FIG. 3) and the edges of the time-space network 450 may represent the interactions between the events or operations.

In embodiments, as units flow through the deconsolidation stream over the planning horizon, the flow may be represented or captured by time-space network 450 as unit flow between the successive stages of the deconsolidation stream over each of the time increments. In the particular example illustrated in FIG. 4B, units may arrive at the hub (e.g., in an arriving train) and may enter the deconsolidation stream at the TA stage at $T_0$. The train may be deconsolidated and the units processed, and the units may exit the deconsolidation process (e.g., may be picked up by customers) at $T_2$, $T_3$, $T_4$, $T_{n-1}$, and $T_n$ in different amounts. For example, the number of units exiting the OG stage of the deconsolidation stream at $T_{n-1}$ may be greater than the number of units exiting the OG stage at $T_3$, as represented by the larger arrow.

With reference back to FIG. 2, it is important to note, at this stage, that some solutions have proposed optimization models that are static and limited in that these models are mathematical representations of either one stream or the other, but not both, over a single time increment. In contrast, the DSRO model of embodiment may model multiple (e.g., both) streams and may evaluate the interaction between both successive terms and nonsequential terms. By modeling both streams of hub operations, DSRO system 160 may facilitate the maximum unit flow through them over the planning horizon, while keeping track of resource availability, replenishment, and consumption and capacity constraints.

Figure 5:
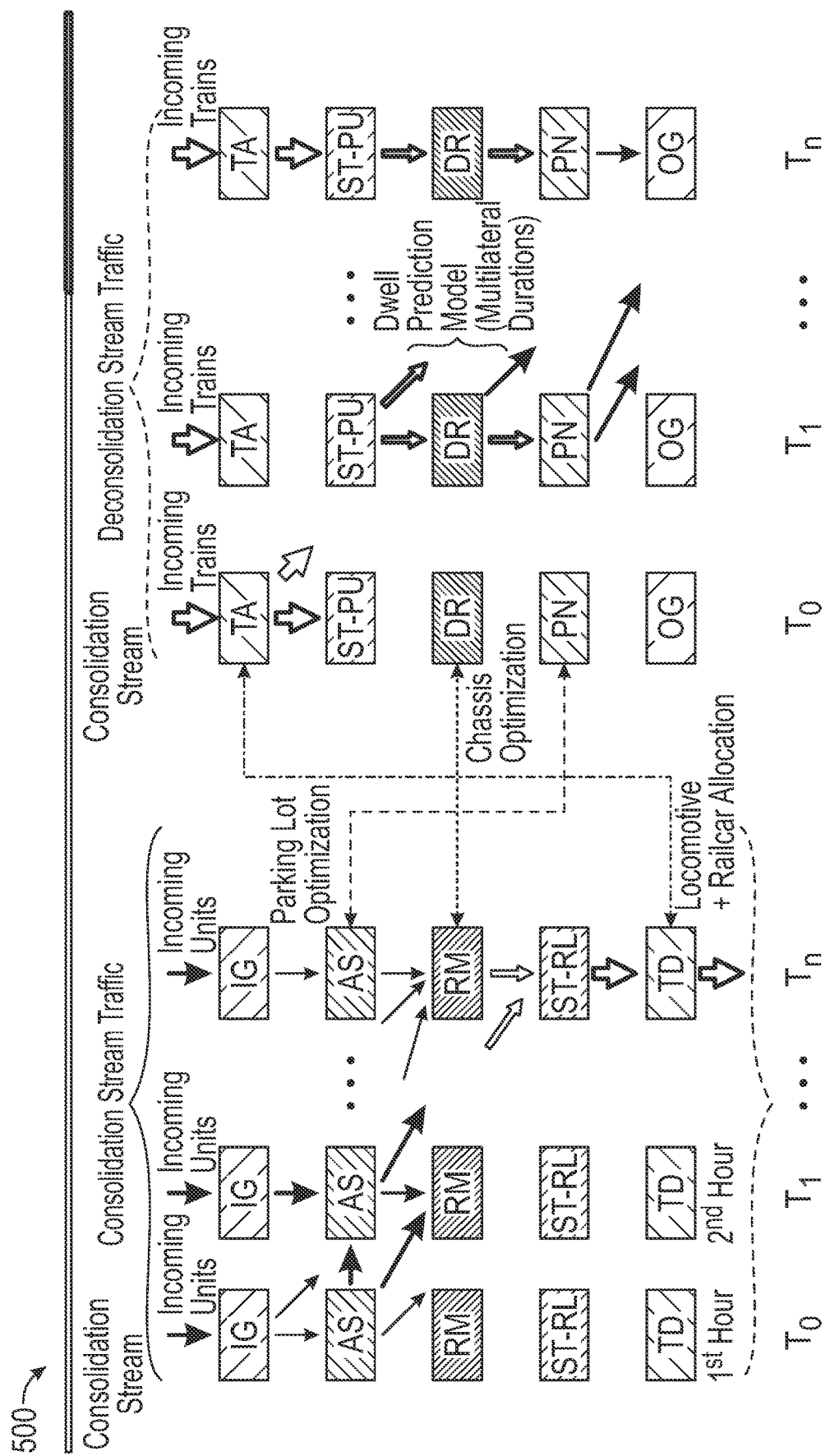
FIG. 5 shows a representation of a DSRO model configured to represent a consolidation stream, a deconsolidation stream, and a resource interdependency between both streams in accordance with embodiments of the present disclosure.

In embodiments, DSRO system 160 may configure the DSRO model to include both time-space networks (e.g., time-space network 400 and time-space network 450) to model both the consolidation stream and the deconsolidation stream together. Although the streams may appear to operate independently, there is a resource interdependency between both streams that intertwines them at every stage of the streams. The DSRO model of embodiments may model not only both streams, but their resource interdependency and may leverage this configuration to optimize the resource utilization of both streams to maximize throughput over the planning horizon. FIG. 5 shows a representation of the DSRO model configured to represent the consolidation stream, the deconsolidation stream, and the resource interdependency between both streams in accordance with embodiments of the present disclosure.

As shown in FIG. 5, the DSRO model may be configured to layer the consolidation stream time-space network and the deconsolidation stream time-space network together, while maintaining their resource interdependency as a link between the two time-space networks. In particular, layering the consolidation stream time-space network and the deconsolidation stream time-space network together may include aligning both time-space networks with respect to the time increments over the planning the horizon. In this manner, the impact of resource availability at any time increment over the planning horizon may be considered and taken into account by the DSRO model in representation 500 to optimize the resource utilization between both streams. Although one link is drawn in FIG. 5 between RM and DR, as an example, several other stages in both streams can interact with each other.

In particular, the DSRO model models the resource interdependency between the TD stage of the consolidation stream and the TA stage of the deconsolidation stream (e.g., as described above with respect to FIG. 3), the resource interdependency between the RM stage of the consolidation stream and the DR stage of the deconsolidation stream (e.g., with respect to chassis utilization as descried above with respect to FIG. 3), and the resource interdependency between the AS stage of the consolidation stream and the PN stage of the deconsolidation stream (e.g., with respect to parking space utilization as descried above with respect to FIG. 3), as non-limiting examples.

With reference back to FIG. 2, DSRO system 160 may be configured to apply the generated DSRO model to the time-expanded networks 120 to optimize the use of the resources by the consolidation and deconsolidation streams over the planning horizon to maximize throughput of the hub over the planning horizon. To that end, DSRO 160 may include a plurality of optimization systems. In particular, all-resources optimization manager 129 may be configured to generate, based on the DSRO model, an optimized operating schedule that may be implemented over a planning horizon to maximize throughput of units through the hub.

In embodiments, all-resources optimization manager 129 may be configured to consider resource availability (e.g., resource inventory), resource replenishment cycles, resource cost, operational implications of inadequate supply of resources, for all the resources involved in the consolidation and deconsolidation streams, based on the DSRO model, to determine the optimized operating schedule that may maximize throughput through the hub over the planning horizon. In embodiments, all-resources optimization manager 129 may be configured to additionally consider unit volumes (e.g., unit volumes expected to flow during the planning horizon through the consolidation stream and the deconsolidation streams, such as at each time increment of the planning horizon) and unit dwell times (e.g., expected dwell times of units flowing through the consolidation stream and the deconsolidation streams during the planning horizon) to determine the optimized operating schedule that may maximize throughput through the hub over the planning horizon.

In particular, the effectiveness of the DSRO model analysis may depend on obtaining data related to the number of units expected to come into the hub through both streams and the respective dwell times of those units in the hub. With respect to the consolidation stream, the number of units that may enter into the consolidation stream (e.g., at each time increment of the planning horizon) may not be known, as the number of units that may enter into the consolidation stream may depend on customer demand, which may vary widely, may be seasonal, cyclical, or even uniform. However, for effective operations of the hub, sufficient resources may need to be pre-allocated to process these units in a timely manner, or customers may need to be turned away or be limited in how many units the customer may ingate into the hub. Nonetheless, the dwell time of the units processed through the consolidation stream is known, as these units may be configured with a "goal time" (e.g., a date/time at which the unit should be delivered at the destination), and the length of time that the unit may spend within the hub may be computed from the goal time. In some embodiments, the hub operator may set the dwell time of each unit entering the consolidation stream over the planning horizon, as the hub operator may know the operating train scheduled during the planning horizon, which may allow the train operator to assign the arriving units to respective trains and, in this manner, set the dwell time of the units.

With respect to the deconsolidation stream, the number of units that may enter into the deconsolidation stream (e.g., at each time increment of the planning horizon) may be known, but the dwell time of the units processed through the deconsolidation stream may be unknown. For example, incoming trains may be scheduled to arrive at the hub, and the number of units being carried by these trains may be known. If a train is not built at the origination of a unit, but is scheduled to be initiated, built, and scheduled to arrive within the planning horizon, the historical averages may be used to determine the unit count being carried by that train. On the other hand, once unit arrives at the hub and enters the deconsolidation stream, it may be up to the customer to come and pick it up from the hub. The dwell time of the unit then is determined by the customer, and so it may be unknown to DSRO system 160.

In embodiments, DSRO system 160 may be configured with an in-gated volume model configured to predict the unknown number of units that may enter into the consolidation stream (e.g., at each time increment of the planning horizon) and/or an inbound unit dwell prediction model configured to predict the unknown dwell time of the units processed through the deconsolidation stream (e.g., at each time increment of the planning horizon). The in-gated volume model may predict the number of units to be in-gated by shipper, size of the unit, destination, and service level for a particular timeframe. In embodiments, the prediction may include unit volume by time increments (e.g., by hourly, daily, etc. increments). In embodiments, all-resources optimization manager 129 may retrieve the current inventory levels in each of the hub lots (parking lots, railcars, locomotives, track occupation etc.) at the outset and may merge them with the in-gate predicted volumes over time, prior to the optimization run.

In embodiments, the inbound unit dwell prediction model may be configured to use a large set of details pertinent to each unit and may predict the individual dwell time of each unit. In embodiments, all-resources optimization manager 129 may classify the predicted dwell durations into a fixed set of bands (e.g., ranges) and may map these ranges to parking lot categories during the lot assignment process.

All-resources optimization manager 129 may generate, based on the DSRO model, the unit volume data, the dwell time data, the resource availability, resource replenishment cycles, resource cost, operational implications of inadequate supply of resources, an optimized operating scheduled that may be configured to process a maximum number of units through the hub over the planning horizon based on the provided data and constraints. In embodiments, generating the optimized operating schedule may include allocating the available resources optimally between the consolidation and deconsolidation streams, and identifying changes that may be implemented to generate the optimized operating schedule. For example, the optimized operating schedule may include an indication that a change to a train schedule should be performed in order to achieve the operating schedule. In another example, the optimized operating schedule may include an indication that additional resources may be required at particular time increment of the planning horizon, and/or at a particular stage of the consolidation or deconsolidation streams, in order to achieve the operating schedule.

In embodiments, the optimized operating schedule may include an indication of the number of units processed through each stage of the consolidation and deconsolidation streams at each time increment of the planning horizon. For example, the optimized operating schedule may include an indication of the number of units in-gated, assigned, ramped, deramped, parked and notified to customer, and out-gated at each time increment of the planning horizon. In embodiments, based on a determination that a particular resource may be completely consumed at a time increment, the optimized operating schedule may include an indication of how many additional units may be processed based on obtaining an additional unit of the resource.

In embodiments, the optimized operating schedule over the planning horizon may be dynamically adjusted by the DSRO system 160. For example, at a particular time increment, a number of units arriving during the particular time increment (e.g., units arriving at the IG state of the consolidation stream and/or units arriving at the TA stage of the deconsolidation stream) may be known, as the units may be processed at the hub and may be counted as arriving units. In this case, the DSRO model may determine whether the predicted unit volume during the particular time increment (e.g., according to the optimized operating schedule) may be different from the actual unit volume during the particular time increment (e.g., according to the units arriving at the hub during the time increment). In response to a determination that there is a difference between the predicted unit volume during the particular time increment and the actual unit volume during the particular time increment, the DSRO model (e.g., all-resources optimization manager 129 using the DSRO model) may apply or consider the difference to revise, refine, or re-generate the optimized operating schedule based on the actual unit volume for the time increment. In this case, the revised optimized operating schedule may include an optimized operating schedule for the remaining time increments of the planning horizon.

This revised optimized operating schedule may represent a refine prediction of the unit volume and resource utilization, as it may take into account the actual resource consumption during the particular time increment, which may be different from the predicted time consumption during the particular time increment (e.g., could be a lower unit volume representing a smaller resource consumption than the predicted resource consumption, or could be a higher unit volume representing a larger resource consumption than the predicted resource consumption).

In embodiments, the planning horizon may be dynamically adjusted, based on events. For example, an incoming train may arrive at the hub later than a scheduled time. In this case, DSRO model 160 may adjust the planning horizon based on the actual arrival of the train at the hub. In some embodiments, the planning horizon can be dynamically adjusted based on one or more factors, including user preference.

In some embodiments, DSRO system 160 may restrict train arrival and departure times, such that all-resources optimization manager 129 may not consider an operating schedule requiring a change in the arrival or departure time of the restricted trains. In this case, all-resources optimization manager 129 may generate the optimized operating schedule for the planning horizon based on the fixed train arrival and departure times. In other embodiments, DSRO system 160 may allow train arrival and departure time changes, such that all-resources optimization manager 129 may consider an operating schedule requiring a change in the arrival or departure time of the restricted trains. In this case, all-resources optimization manager 129 may generate an optimized operating schedule for the planning horizon that may require a change to the train arrival or departure times (e.g., may delay or move up the arrival time).

In embodiments, DSRO system 160 may include various post-optimization systems that may be configured to provide further optimization of the hub operations. These post-optimization systems may operate to define, refine, or otherize determine operations in an optimized manner, which may provide further optimizations to, or may facilitate implementation of, the optimized operating schedule.

In embodiments, parking lot optimization system 121 may be configured to maximize the throughput of the parking spaces of the hub by assigning units to parking spaces based on the expected dwell time of the units. For example, parking lot optimization system 121 may be configured to maximize the throughput of the parking spaces of the hub by ensuring that short-dwelling units are assigned to parking spaces that are easily accessible, that medium-dwelling units to are assigned to parking spaces that are somewhat less accessible than the easily accessible parking spaces, and so on, based on the hub lots and so on. In embodiments, the parking lot optimization system 121 may consider the interaction between the consolidation stream time-space network and the deconsolidation stream time-space network, and the unit volume and dwell composition of each stream while allocating the parking spaces optimally. In embodiments, constraints relevant to other key resources of the hub may be part of parking lot optimization system 121 operations and may act as guardrails to keep the final recommendations from parking lot optimization system 121 valid and optimal.

In embodiments, parking classification system 122 may be configured to classify parking lots into different categories, depending on their proximity to tracks and access. These categories may be used by the DSRO system 160 to assign units to these spaces based on the unit dwell time. For example, some parking lots, by virtue of their relative position to the tracks, may be closer to the production tracks and may be better suited to have higher throughput (e.g., more turns). Hostlers may drive short distances and parking lots next to the production tracks are so configured as to give an easier access to hostler drivers. DSRO system 160 may assign units with short dwell times to these trackside lots, leading to more turns. DSRO system 160 may evaluate parking space availability and unit flow coupled with the likely dwell times from both streams and may assign units to appropriate parking spaces for the entire planning horizon. Similarly, parking lots away from those active tracks may require such resources as hostlers and drivers to move the units farther and those moves may be kept to a minimum to lessen the demand for those resources.

In embodiments, chassis optimization system 123 may be configured to maximize the throughput of the hub by allocating chassis to customers optimally, while taking replenishment cycle times into account. For example, chassis optimization system 123 may be configured to use the consolidation stream time-space network and the deconsolidation stream time-space network to maximize the flow of units through the streams during the planning horizon, while managing chassis inventory, future replenishments, and ramp-deramp event synchronization.

In embodiments, dynamic chassis pools system 124 may be configured to pool chassis resources from multiple pools and to facilitate better unit flow through the facility. The functionality of dynamic chassis pools system 124 may address variations and may try to negotiate or exchange chassis between pools in one time increment of the planning horizon and replenish in another time increment without creating a deficiency in either chassis pool operator.

In embodiments, diffusion system 125 may be configured to assign parking spaces to consolidation stream units that are closer to the train to which these units may be assigned. In this manner, the travel distance between the parking space and the departing train may be minimized, thereby minimizing the time required to build the departing train. The functionality of diffusion system 125 may facilitate expediting the ramping process by spreading or thinning the hostler movement within the hub. In particular, diffusion system 125 may assign parking spaces to individual units as a post-optimization activity (e.g., after the DSRO system 160 optimizes the resources and operations) to spread the units across the parking spaces of the hub.

In embodiments, interlot repositioning system 126 may be configured to identify moves between two different hub lots (excluding tracks) to either expedite the ramping operation, or handle parking lot deficits. The functionality of interlot repositioning system 126 may operate to determine that an original lot assignment that was suboptimal could be performed based on parking space inventory levels at that time and interlot repositioning system 126 may undo that move and get closer to the optimal solution. This may necessitate an additional hostler move but ultimately the time required to ramp the train may be shorter.

In embodiments, hostler optimization system 127 may be configured to pair deramp and ramp activities associated with the inbound and outbound trains respectively, wherever possible, in order to match hostler movements aimed at ramping and deramping, thus minimizing non-productive moves. In this manner, the functionality of hostler optimization system 127 may be used to utilize, to the maximum capacity, hostlers executing workorders, and their moves in both directions may be productive. For example, a hostler may unload a unit from an arriving train (e.g., may deramp the unit) and may haul or move the unit to an assigned parking, as recommended by hostler optimization system 127, and the hostler may then proceed to the parking space to pick up a unit to be ramped on an outgoing train. The location of both parking spaces is such that the movements of the hostler are productive in both directions. Indeed, the functionality of hostler optimization system 127 may operate to recommend ramp-deramp or deramp-ramp so that hostler movements in both directions are as productive as possible.

In embodiments, ramp planning system 128 may be configured to schedule inbound and outbound trains in an optimal manner to maximize resource utilization and may promote on-time performance of the trains. The functionality of ramp planning system 128 may use such traditional scheduling components as events, jobs, and resources while scheduling the trains. For example, ramp planning system 128 may generate track-train assignment for the length of the planning horizon by taking resource availability at intermediate time intervals and exploring demand for resources by different train sequences. The functionality of ramp planning system 128 may evaluate different sequences of inbound-outbound trains and intermediate setups needed before picking the best train sequence for each production track.

Figure 6:
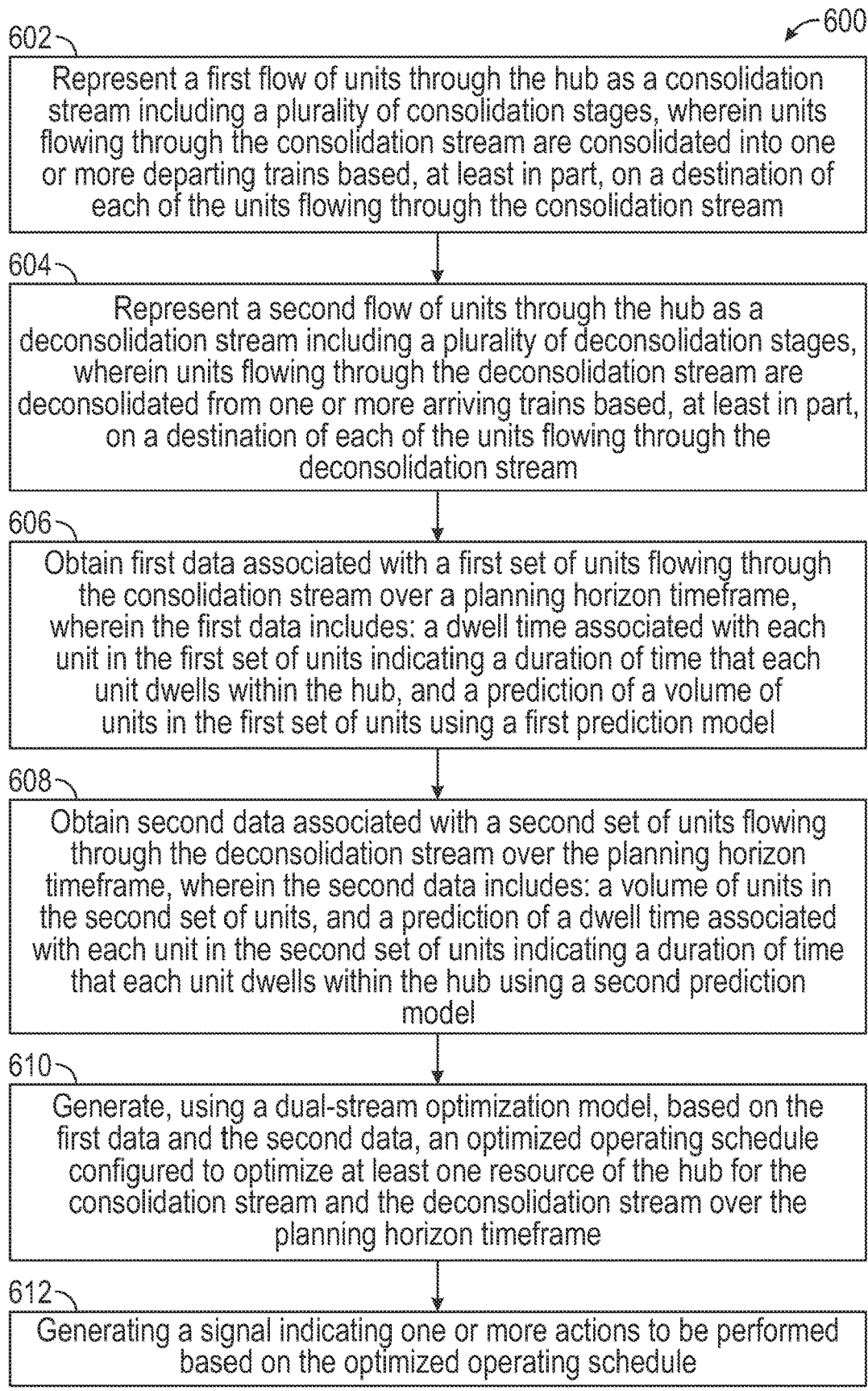
FIG. 6 shows a high-level flow diagram of operations of a system for providing functionality for managing resources of a hub based on dual-stream resource optimization in accordance with embodiments of the present disclosure.

FIG. 6 shows a high-level flow diagram 600 of operation of a system configured for providing functionality for managing hub resources based on dual-stream resource optimization in accordance with embodiments of the present disclosure. For example, the functions illustrated in the example blocks shown in FIG. 6 may be performed by system 100 of FIG. 1 according to embodiments herein. In embodiments, the operations of the method 600 may be stored as instructions that, when executed by one or more processors, cause the one or more processors to perform the operations of the method 600.

At block 602, a first flow of units through the hub is represented as a consolidation stream including a plurality of consolidation stages. In embodiments, units flowing through the consolidation stream are consolidated into one or more departing trains based, at least in part, on a destination of each of the units flowing through the consolidation stream. In embodiments, functionality of a DSRO system (e.g., DSRO system 160 as illustrated in FIGS. 2 and 3) may be used to represent a first flow of units through the hub as a consolidation stream including a plurality of consolidation stages. In embodiments, the DSRO system may perform operations to represent a first flow of units through the hub as a consolidation stream including a plurality of consolidation stages according to operations and functionality as described above with reference to DSRO system 160 and as illustrated in FIGS. 1-5.

At block 604, a second flow of units through the hub is represented as a deconsolidation stream including a plurality of deconsolidation stages. In embodiments, units flowing through the deconsolidation stream are deconsolidated from one or more arriving trains. In embodiments, functionality of a DSRO system (e.g., DSRO system 160 as illustrated in FIGS. 2 and 3) may be used to represent a second flow of units through the hub as a deconsolidation stream including a plurality of deconsolidation stages. In embodiments, the DSRO system may perform operations to represent a second flow of units through the hub as a deconsolidation stream including a plurality of deconsolidation stages according to operations and functionality as described above with reference to DSRO system 160 and as illustrated in FIGS. 1-5.

At block 606, first data associated with a first set of units flowing through the consolidation stream over a planning horizon timeframe is obtained. In embodiments, the first data may include a dwell time associated with each unit in the first set of units indicating a duration of time that each unit dwells within the hub, and a prediction of a volume of units in the first set of units using a first prediction model. In embodiments, functionality of an all-resources optimization manager (e.g., all-resources optimization manager 129 as illustrated in FIG. 3) may be used to obtain first data associated with a first set of units flowing through the consolidation stream over a planning horizon timeframe. In embodiments, the all-resources optimization manager may perform operations to obtain first data associated with a first set of units flowing through the consolidation stream over a planning horizon timeframe according to operations and functionality as described above with reference to all-resources optimization manager 129 and as illustrated in FIGS. 1-5.

At block 608, second data associated with a second set of units flowing through the deconsolidation stream over the planning horizon timeframe is obtained. In embodiments, the second data may include a volume of units in the second set of units, and a prediction of a dwell time associated with each unit in the second set of units indicating a duration of time that each unit dwells within the hub using a second prediction model. In embodiments, functionality of an all-resources optimization manager (e.g., all-resources optimization manager 129 as illustrated in FIG. 3) may be used to obtain second data associated with a second set of units flowing through the deconsolidation stream over the planning horizon timeframe. In embodiments, the all-resources optimization manager may perform operations to obtain second data associated with a second set of units flowing through the deconsolidation stream over the planning horizon timeframe according to operations and functionality as described above with reference to all-resources optimization manager 129 and as illustrated in FIGS. 1-5.

At block 610, an optimized operating schedule configured to optimize at least one resource of the hub for the consolidation stream and the deconsolidation stream over the planning horizon timeframe is generated using a dual-stream optimization model, based on the first data and the second data. In embodiments, functionality of an all-resources optimization manager (e.g., all-resources optimization manager 129 as illustrated in FIG. 3) may be used to generate, using a dual-stream optimization model, based on the first data and the second data, an optimized operating schedule configured to optimize at least one resource of the hub for the consolidation stream and the deconsolidation stream over the planning horizon timeframe. In embodiments, the all-resources optimization manager may perform operations to generate, using a dual-stream optimization model, based on the first data and the second data, an optimized operating schedule configured to optimize at least one resource of the hub for the consolidation stream and the deconsolidation stream over the planning horizon timeframe according to operations and functionality as described above with reference to all-resources optimization manager 129 and as illustrated in FIGS. 1-5.

At block 612, a signal indicating one or more actions to be performed based on the optimized operating schedule is generated. In embodiments, functionality of an all-resources optimization manager (e.g., all-resources optimization manager 129 as illustrated in FIG. 3) may be used to generate a signal indicating one or more actions to be performed based on the optimized operating schedule. In embodiments, the all-resources optimization manager may perform operations to generate a signal indicating one or more actions to be performed based on the optimized operating schedule according to operations and functionality as described above with reference to all-resources optimization manager 129 and as illustrated in FIGS. 1-5.

Persons skilled in the art will readily understand that advantages and objectives described above would not be possible without the particular combination of computer hardware and other structural components and mechanisms assembled in this inventive system and described herein. Additionally, the algorithms, methods, and processes disclosed herein improve and transform any general-purpose computer or processor disclosed in this specification and drawings into a special purpose computer programmed to perform the disclosed algorithms, methods, and processes to achieve the aforementioned functionality, advantages, and objectives. It will be further understood that a variety of programming tools, known to persons skilled in the art, are available for generating and implementing the features and operations described in the foregoing. Moreover, the particular choice of programming tool(s) may be governed by the specific objectives and constraints placed on the implementation selected for realizing the concepts set forth herein and in the appended claims.

The description in this patent document should not be read as implying that any particular element, step, or function can be an essential or critical element that must be included in the claim scope. Also, none of the claims can be intended to invoke 35 U.S.C. § 112 (f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," "processing device," or "controller" within a claim can be understood and intended to refer to structures known to those skilled in the relevant art, as further modified or enhanced by the features of the claims themselves, and can be not intended to invoke 35 U.S.C. § 112 (f). Even under the broadest reasonable interpretation, in light of this paragraph of this specification, the claims are not intended to invoke 35 U.S.C. § 112 (f) absent the specific language described above.

The disclosure may be embodied in other specific forms without departing from the spirit or essential characteristics thereof. For example, each of the new structures described herein, may be modified to suit particular local variations or requirements while retaining their basic configurations or structural relationships with each other or while performing the same or similar functions described herein. The present embodiments are therefore to be considered in all respects as illustrative and not restrictive. Accordingly, the scope of the disclosure can be established by the appended claims. All changes which come within the meaning and range of equivalency of the claims are therefore intended to be embraced therein. Further, the individual elements of the claims are not well-understood, routine, or conventional. Instead, the claims are directed to the unconventional inventive concept described in the specification Those of skill in the art would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various embodiments of the present disclosure may be combined or performed in ways other than those illustrated and described herein.

Functional blocks and modules in FIGS. 1-6 may comprise processors, electronics devices, hardware devices, electronics components, logical circuits, memories, software codes, firmware codes, etc., or any combination thereof. Consistent with the foregoing, various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal, base station, a sensor, or any other communication device. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

Although the present disclosure and its advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods, and steps described in the specification. As one of ordinary skill in the art will readily appreciate from the disclosure of the present disclosure, processes, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A method of optimizing utilization of resources in a hub, comprising:
   representing a first flow of units through the hub as a consolidation stream including a plurality of consolidation stages, wherein units flowing through the consolidation stream are consolidated into one or more departing trains based, at least in part, on a destination of each of the units flowing through the consolidation stream, wherein representing the first flow of units through the hub as a consolidation stream includes generating a first time-space network based on the consolidation stream over a planning horizon timeframe, wherein each node of the first time-space network represents a respective stage of the plurality of consolidation stages, each stage of the plurality of consolidation stages configured to facilitate the loading of the units onto the one or more departing trains within the hub, and wherein an edge between two nodes of the first time-space network represents a resource capacity between the two nodes of the first time-space network;
   representing a second flow of units through the hub as a deconsolidation stream including a plurality of deconsolidation stages, wherein units flowing through the deconsolidation stream are deconsolidated from one or more arriving trains based, at least in part, on a destination of each of the units flowing through the deconsolidation stream, wherein representing the second flow of units through the hub as a deconsolidation stream includes generating a second time-space network based on the deconsolidation over the planning horizon timeframe, wherein each node of the second time-space network represents a respective stage of the plurality of deconsolidation stages, each stage of the plurality of deconsolidation stages configured to facilitate the unloading of the units from the one or more arriving trains within the hub, and an edge between two nodes of the second time-space network represents a resource capacity between the two nodes of the second time-space network;
   obtaining first data associated with a first set of units flowing through the consolidation stream over the planning horizon timeframe, wherein the first data includes: a dwell time associated with each unit in the first set of units indicating a duration of time that each unit dwells within the hub, and a prediction of a volume of units in the first set of units using a first prediction model;
   obtaining second data associated with a second set of units flowing through the deconsolidation stream over the planning horizon timeframe, wherein the second data includes: a volume of units in the second set of units, and a prediction of a dwell time associated with each unit in the second set of units indicating a duration of time that each unit dwells within the hub using a second prediction model;
   generating, using a dual-stream optimization model, based on the first data and the second data, an optimized operating schedule configured to optimize at least one resource of the hub for the consolidation stream and the deconsolidation stream over the planning horizon timeframe, wherein generating the optimized operating schedule includes layering the first time-space network and the second time-space network together to align nodes of the first time-space network to nodes of the second time-space network at each time increment of the planning horizon timeframe such that a status of a resource of the hub affects both the consolidation stream and the deconsolidation stream; and
   generating a signal indicating one or more actions to be performed based on the optimized operating schedule; and
   sending a control signal, in response to a generation of the signal, to at least one physical resource of the hub to cause the at least one physical resource to physically reposition from a first location to a second location to enable the optimized operating schedule.

2. The method of claim 1, wherein the optimized operating schedule configured to optimize the at least one resource of the hub for the consolidation stream and the deconsolidation stream over the planning horizon timeframe is configured to maximize the throughput of units processed through the hub over the planning horizon timeframe.

3. The method of claim 1, wherein generating the optimized operating schedule includes:

allocating the at least one resource of the hub optimally between the consolidation and deconsolidation streams; and identifying one or more changes for implementing the optimized operating scheduled.

4. The method of claim 3, wherein the signal indicating the one or more actions to be performed based on the optimized operating schedule includes an indication to implement the one or more changes.

5. The method of claim 3, wherein the one or more changes include one or more of:
an indication to perform a change to a train schedule to achieve the optimized operating schedule; and
an indication that additional resources are required to be added at particular time increment of the planning horizon timeframe to achieve the optimized operating schedule.

6. The method of claim 1, wherein the optimized operating schedule includes one or more of:
an indication of a number of units processed through each stage of the plurality of consolidation stage at each time increment of the planning horizon timeframe; and
an indication of a number of units processed through each stage of the plurality of deconsolidation stage at each time increment of the planning horizon timeframe.

7. The method of claim 1, wherein the at least one resource of the hub includes one or more of:
one or more resources for which the consolidation stream and the deconsolidation stream compete during at least one consolidation stage of the plurality of consolidation stages and at least one deconsolidation stage of the plurality of deconsolidation stages; and
one or more resources for which the consolidation stream and the deconsolidation stream complement each other during the at least one consolidation stage of the plurality of consolidation stages and the at least one deconsolidation stage of the plurality of deconsolidation stages.

8. The method of claim 1, wherein a first set of consolidation stages of the plurality of consolidation stages supply resources during the consolidation stream, wherein a second set of consolidation stages of the plurality of consolidation stages consume resources during the consolidation stream, wherein a first set of deconsolidation stages of the plurality of consolidation stages supply resources during the deconsolidation stream, and wherein a second set of deconsolidation stages of the plurality of consolidation stages consume resources during the deconsolidation stream.

9. A system configured to optimize utilization of resources in a hub, comprising:
at least one processor; and
a memory operably coupled to the at least one processor and storing processor-readable code that, when executed by the at least one processor, is configured to perform operations including:
representing a first flow of units through the hub as a consolidation stream including a plurality of consolidation stages, wherein units flowing through the consolidation stream are consolidated into one or more departing trains based, at least in part, on a destination of each of the units flowing through the consolidation stream, wherein representing the first flow of units through the hub as a consolidation stream includes generating a first time-space network based on the consolidation stream over a planning horizon timeframe, wherein each node of the first time-space network represents a respective stage of the plurality of consolidation stages, each stage of the plurality of consolidation stages configured to facilitate the loading of the units onto the one or more departing trains within the hub, and wherein an edge between two nodes of the first time-space network represents a resource capacity between the two nodes of the first time-space network;

representing a second flow of units through the hub as a deconsolidation stream including a plurality of deconsolidation stages, wherein units flowing through the deconsolidation stream are deconsolidated from one or more arriving trains based, at least in part, on a destination of each of the units flowing through the deconsolidation stream, wherein representing the second flow of units through the hub as a deconsolidation stream includes generating a second time-space network based on the deconsolidation over the planning horizon timeframe, wherein each node of the second time-space network represents a respective stage of the plurality of deconsolidation stages, each stage of the plurality of deconsolidation stages configured to facilitate the unloading of the units from the one or more arriving trains within the hub, and an edge between two nodes of the second time-space network represents a resource capacity between the two nodes of the second time-space network;

obtaining first data associated with a first set of units flowing through the consolidation stream over the planning horizon timeframe, wherein the first data includes: a dwell time associated with each unit in the first set of units indicating a duration of time that each unit dwells within the hub, and a prediction of a volume of units in the first set of units using a first prediction model;

obtaining second data associated with a second set of units flowing through the deconsolidation stream over the planning horizon timeframe, wherein the second data includes: a volume of units in the second set of units, and a prediction of a dwell time associated with each unit in the second set of units indicating a duration of time that each unit dwells within the hub using a second prediction model;

generating, using a dual-stream optimization model, based on the first data and the second data, an optimized operating schedule configured to optimize at least one resource of the hub for the consolidation stream and the deconsolidation stream over the planning horizon timeframe, wherein generating the optimized operating schedule includes layering the first time-space network and the second time-space network together to align nodes of the first time-space network to nodes of the second time-space network at each time increment of the planning horizon timeframe such that a status of a resource of the hub affects both the consolidation stream and the deconsolidation stream;

generating a signal indicating one or more actions to be performed based on the optimized operating schedule; and sending a control signal, in response to a generation of the signal, to at least one physical resource of the hub to cause the at least one physical resource to physically reposition from a first location to a second location to enable the optimized operating schedule.

10. The system of claim 9, wherein the optimized operating schedule configured to optimize the at least one resource of the hub for the consolidation stream and the deconsolidation stream over the planning horizon timeframe is configured to maximize the throughput of units processed through the hub over the planning horizon timeframe.

11. The system of claim 9, wherein generating the optimized operating schedule includes:
   allocating the at least one resource of the hub optimally between the consolidation and deconsolidation streams; and
   identifying one or more changes for implementing the optimized operating scheduled.

12. The system of claim 11, wherein the signal indicating the one or more actions to be performed based on the optimized operating schedule includes an indication to implement the one or more changes.

13. The system of claim 3, wherein the one or more changes include one or more of:
   an indication to perform a change to a train schedule to achieve the optimized operating schedule; and
   an indication that additional resources are required to be added at particular time increment of the planning horizon timeframe to achieve the optimized operating schedule.

14. The system of claim 9, wherein the optimized operating schedule includes one or more of:
   an indication of a number of units processed through each stage of the plurality of consolidation stage at each time increment of the planning horizon timeframe; and
   an indication of a number of units processed through each stage of the plurality of deconsolidation stage at each time increment of the planning horizon timeframe.

15. The system of claim 9, wherein the at least one resource of the hub includes one or more of:
   one or more resources for which the consolidation stream and the deconsolidation stream compete during at least one consolidation stage of the plurality of consolidation stages and at least one deconsolidation stage of the plurality of deconsolidation stages; and
   one or more resources for which the consolidation stream and the deconsolidation stream complement each other during the at least one consolidation stage of the plurality of consolidation stages and the at least one deconsolidation stage of the plurality of deconsolidation stages.

16. A computer-based tool for optimizing utilization of resources in a hub, the computer-based tool including non-transitory computer readable media having stored thereon computer code which, when executed by a processor, causes a computing device to perform operations comprising:
   representing a first flow of units through the hub as a consolidation stream including a plurality of consolidation stages, wherein units flowing through the consolidation stream are consolidated into one or more departing trains based, at least in part, on a destination of each of the units flowing through the consolidation stream, wherein representing the first flow of units through the hub as a consolidation stream includes generating a first time-space network based on the consolidation stream over a planning horizon timeframe, wherein each node of the first time-space network represents a respective stage of the plurality of consolidation stages, each stage of the plurality of consolidation stages configured to facilitate the loading of the units onto the one or more departing trains within the hub, and wherein an edge between two nodes of the first time-space network represents a resource capacity between the two nodes of the first time-space network;
   representing a second flow of units through the hub as a deconsolidation stream including a plurality of deconsolidation stages, wherein units flowing through the deconsolidation stream are deconsolidated from one or more arriving trains based, at least in part, on a destination of each of the units flowing through the deconsolidation stream, wherein representing the second flow of units through the hub as a deconsolidation stream includes generating a second time-space network based on the deconsolidation over the planning horizon timeframe, wherein each node of the second time-space network represents a respective stage of the plurality of deconsolidation stages, each stage of the plurality of deconsolidation stages configured to facilitate the unloading of the units from the one or more arriving trains within the hub, and an edge between two nodes of the second time-space network represents a resource capacity between the two nodes of the second time-space network;
   obtaining first data associated with a first set of units flowing through the consolidation stream over the planning horizon timeframe, wherein the first data includes: a dwell time associated with each unit in the first set of units indicating a duration of time that each unit dwells within the hub, and a prediction of a volume of units in the first set of units using a first prediction model;
   obtaining second data associated with a second set of units flowing through the deconsolidation stream over the planning horizon timeframe, wherein the second data includes: a volume of units in the second set of units, and a prediction of a dwell fime associated with each unit in the second set of units indicating a duration of time that each unit dwells within the hub using a second prediction model;
   generating, using a dual-stream optimization model, based on the first data and the second data, an optimized operating schedule configured to optimize at least one resource of the hub for the consolidation stream and the deconsolidation stream over the planning horizon timeframe, wherein generating the optimized operating schedule includes layering the first time-space network and the second time-space network together to align nodes of the first time-space network to nodes of the second time-space network at each time increment of the planning horizon timeframe such that a status of a resource of the hub affects both the consolidation stream and the deconsolidation stream; and
   generating a signal indicating one or more actions to be performed based on the optimized operating schedule; and
   sending a control signal, in response to a generation of the signal, to at least one physical resource of the hub to cause the at least one physical resource to physically reposition from a first location to a second location to enable the optimized operating schedule.

* * * * *